(12) United States Patent
Ishizaki et al.

(10) Patent No.: US 10,353,528 B2
(45) Date of Patent: Jul. 16, 2019

(54) DETECTION DEVICE AND DISPLAY DEVICE

(71) Applicant: Japan Display Inc., Tokyo (JP)

(72) Inventors: Koji Ishizaki, Tokyo (JP); Hayato Kurasawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/163,981

(22) Filed: Oct. 18, 2018

(65) Prior Publication Data
US 2019/0050088 A1 Feb. 14, 2019

Related U.S. Application Data

(63) Continuation of application No. 15/477,264, filed on Apr. 3, 2017, now Pat. No. 10,126,899.

(30) Foreign Application Priority Data

Apr. 4, 2016 (JP) .................. 2016-075499
Aug. 5, 2016 (JP) .................. 2016-154994

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04108* (2013.01); *G06F 2203/04111* (2013.01); *G06F 2203/04112* (2013.01)

(58) Field of Classification Search
CPC ....... G06F 3/044; G06F 3/0416; G06F 3/0412
See application file for complete search history.

(56) References Cited

U.S. PATENT DOCUMENTS

2008/0123245 A1  5/2008  Lee
2010/0214262 A1  8/2010  Ishizaki et al.
(Continued)

FOREIGN PATENT DOCUMENTS

CN  103295671  9/2013
CN  105278733  1/2016
(Continued)

OTHER PUBLICATIONS

Office action dated Sep. 15, 2017 in corresponding Taiwanese patent application No. 106110709.
(Continued)

*Primary Examiner* — Gerald Johnson
(74) *Attorney, Agent, or Firm* — K&L Gates LLP

(57) ABSTRACT

A detection device includes a substrate; a plurality of first conductive thin wires provided in a plane parallel to the substrate and extending in a first direction; a plurality of second conductive thin wires provided in the same layer as that of the first conductive thin wires and extending in a second direction forming an angle with the first direction; first groups that are disposed in first strip-like regions respectively having a first width, each of the first groups including at least two of the first conductive thin wires displaced from one another in the second direction; and second groups that are disposed in second strip-like regions respectively having a second width, each of the second groups including at least two of the second conductive thin wires displaced from one another in the first direction.

8 Claims, 17 Drawing Sheets

(56) References Cited

U.S. PATENT DOCUMENTS

| | | |
|---|---|---|
| 2012/0135579 A1 | 5/2012 | Park |
| 2013/0278528 A1 | 10/2013 | Ishizaki et al. |
| 2014/0055380 A1 | 2/2014 | Han et al. |
| 2014/0292713 A1 | 10/2014 | Koito et al. |
| 2014/0353013 A1 | 12/2014 | Zhao et al. |
| 2015/0103276 A1 | 4/2015 | Ishizaki et al. |
| 2015/0103277 A1 | 4/2015 | Ishizaki et al. |
| 2015/0355751 A1 | 12/2015 | Kurasawa et al. |
| 2016/0111641 A1* | 4/2016 | Kobayashi .......... H01L 45/1253 257/4 |
| 2017/0031490 A1 | 2/2017 | Hashida et al. |
| 2017/0045979 A1* | 2/2017 | Li ......................... G06F 3/044 |

FOREIGN PATENT DOCUMENTS

| | | |
|---|---|---|
| JP | 2010-197576 | 9/2010 |
| JP | 2014-041589 | 3/2014 |
| JP | 2014-191657 | 10/2014 |
| WO | 2015159460 | 10/2015 |

OTHER PUBLICATIONS

Korean Office Action dated Nov. 30, 2017 in corresponding Korean Application No. 10-2017-0039966.
Korean Office Action dated Dec. 20, 2018 in corresponding Korean Application No. 10-2018-0117537.

* cited by examiner

DETECTION DEVICE AND DISPLAY DEVICE

CROSS-REFERENCE TO RELATED APPLICATIONS

This application is a continuation application of U.S. patent application Ser. No. 15/477,264, filed on Apr. 3, 2017, which application claims priority from Japanese Application No. 2016-075499, filed on Apr. 4, 2016 and Japanese Application No. 2016-154994, filed on Aug. 5, 2016, the contents of which are incorporated by reference herein in its entirety.

BACKGROUND

1. Technical Field

The present disclosure relates to a detection device that is capable of detecting an external proximate object, and in particular, to a detection device and a display device that are capable of detecting an external proximate object based on a change in electrostatic capacitance.

2. Description of the Related Art

In recent years, attention has been attracted to a detection device commonly called a touchscreen panel that is capable of detecting an external proximate object. The touchscreen panel is mounted on or integrated with a display device, such as a liquid crystal display device, and is used as a display device with a touch detection function. The display device with a touch detection function displays, for example, various button images on the display device so as to allow information input using the touchscreen panel as a substitute for typical mechanical buttons. The display device with a touch detection function having the touchscreen panel as described above does not need input devices, such as a keyboard, a mouse, and a keypad, and hence tends to be more widely used also in, for example, computers and portable information terminals, such as mobile phones.

Several types of the touch detection device are present, such as an optical type, a resistive type, and a capacitive type. The capacitive touch detection device is used in, for example, portable terminals, has a relatively simple structure, and can achieve low power consumption. For example, Japanese Patent Application Laid-open Publication No. 2010-197576 describes a touchscreen panel in which a transparent electrode pattern is made invisible.

The detection device capable of detecting an external proximate object is further required to have lower-resistance detection electrodes to achieve a smaller thickness, a larger screen size, or a higher definition. A light-transmitting conductive oxide, such as an indium tin oxide (ITO), is used as a material of light-transmitting electrodes serving as the detection electrodes. An electrically conductive material, such as a metallic material, is effectively used for reducing the resistance of the detection electrodes. However, using the electrically conductive material, such as a metallic material, can cause a moire pattern to be seen due to interference between pixels of the display device and the electrically conductive material, such as a metallic material.

Hence, Japanese Patent Application Laid-open Publication No. 2014-041589 (JP-A-2014-041589) describes a detection device in which detection electrodes of an electrically conductive material, such as a metallic material, are used, but the moire pattern can be made less visible. The moire pattern can be made less visible in the detection device described in JP-A-2014-041589. However, when visible light comes in, a light intensity pattern generated by diffraction or scattering of the light due to the detection electrodes forms nearly a plurality of scattered spots of light, which can be visible.

For the foregoing reasons, there is a need for providing a detection device and a display device capable of detecting an external proximate object that can make the scattered spots of light less visible while using detection electrodes of an electrically conductive material, such as a metallic material.

SUMMARY

According to an aspect, a detection device includes a substrate, a plurality of first conductive thin wires that are provided in a plane parallel to the substrate and extend in a first direction, a plurality of second conductive thin wires that are provided in the same layer as that of the first conductive thin wires and extend in a second direction forming an angle with the first direction, first groups that are disposed in first strip-like regions respectively having a first width, each of the first groups including at least two of the first conductive thin wires displaced from one another in the second direction, and second groups that are disposed in second strip-like regions respectively having a second width, each of the second groups including at least two of the second conductive thin wires displaced from one another in the first direction. The first conductive thin wires are in contact with the second conductive thin wires in intersection regions between the first strip-like regions and the second strip-like regions.

According to another aspect, a display device includes a detection device, and a display region. The first conductive thin wires and the second conductive thin wire are provided in an area overlapping the display region.

Additional features and advantages are described herein, and will be apparent from the following Detailed Description and the figures.

DETAILED DESCRIPTION

Figure 1:
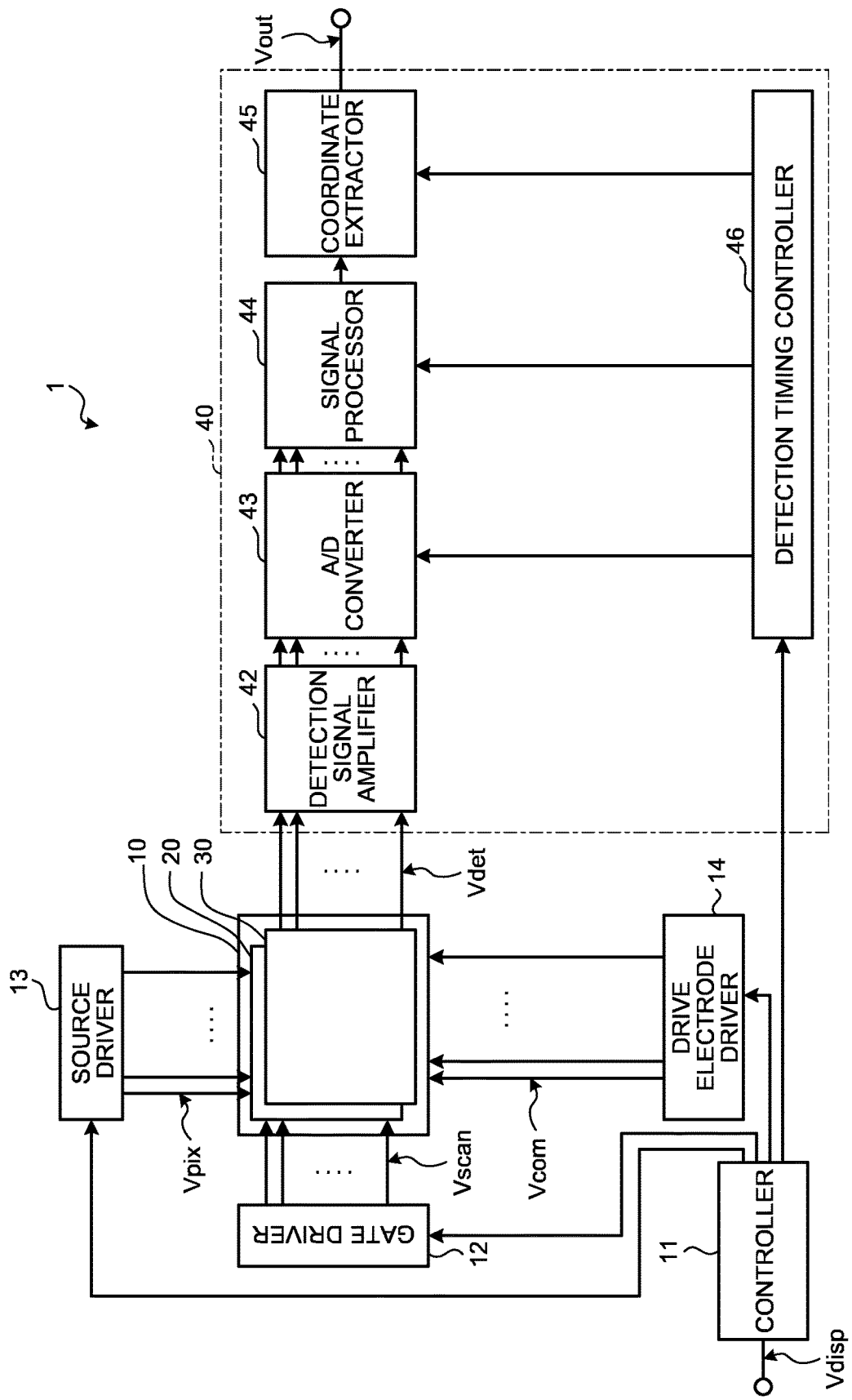
FIG. 1 is a block diagram illustrating a configuration example of a display device with a touch detection function according to a first embodiment.

Embodiments of the present application will be described below in detail with reference to the drawings. The present invention is not limited to the description of the embodiments to be given below. Components to be described below include those easily conceivable by those skilled in the art, and those substantially the same. Furthermore, the components to be described below can be combined as appropriate. The disclosure is merely an example, and the present invention naturally encompasses appropriate modifications easily conceivable by those skilled in the art while maintaining the gist of the invention. To further clarify the description, widths, thicknesses, shapes, and the like of various parts will be schematically illustrated in the drawings as compared with actual aspects thereof, in some cases. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

First Embodiment

FIG. 1 is a block diagram illustrating a configuration example of a display device with a touch detection function according to a first embodiment. This display device with a touch detection function 1 includes a display unit with a touch detection function 10, a controller 11, a gate driver 12, a source driver 13, a drive electrode driver 14, and a touch detector (also simply called a detector) 40. The display unit with a touch detection function 10 is a device obtained by integrating a display device 20 generally called a liquid crystal display device with a capacitive detection device 30. The display unit with a touch detection function 10 may be a device obtained by mounting the capacitive detection device 30 above the display device 20. The display device 20 may be, for example, an organic electroluminescent (EL) display device. The gate driver 12, the source driver 13, or the drive electrode driver 14 may be provided in the display unit 10.

The display device 20 is a device that performs display by sequentially scanning one horizontal line at a time according to a scan signal Vscan supplied from the gate driver 12, as will be described later. The controller 11 is a circuit (control device) that supplies a control signal to each of the gate driver 12, the source driver 13, the drive electrode driver 14, and the touch detector 40 based on an externally supplied video signal Vdisp, and thus controls these drivers and the detector so as to operate them in synchronization with one another.

The gate driver 12 has a function to sequentially select, based on the control signal supplied from the controller 11, one horizontal line of the display unit with a touch detection function 10 to be driven to be displayed.

The source driver 13 is a circuit that supplies a pixel signal Vpix to each sub-pixel SPix (to be described later) of the display unit with a touch detection function 10 based on the control signal supplied from the controller 11.

The drive electrode driver 14 is a circuit that supplies drive signals Vcom to drive electrodes COML (to be described later) of the display unit with a touch detection function 10 based on the control signal supplied from the controller 11.

The touch detector 40 is a circuit that detects, based on the control signal supplied from the controller 11 and detection signals Vdet supplied from the detection device 30 of the display unit with a touch detection function 10, whether the detection device 30 is touched (in a contact or proximate state to be described later), and if the touch detection device 30 is touched, obtains the coordinates of the touch in a touch detection region. The touch detector 40 includes a detection signal amplifier 42, an analog-to-digital (A/D) converter 43, a signal processor 44, a coordinate extractor 45, and a detection timing controller 46.

The detection signal amplifier 42 amplifies the detection signals Vdet supplied from the detection device 30. The detection signal amplifier 42 may include a low-pass analog filter that removes high-frequency components (noise components) included in the detection signals Vdet to extract touch components, and outputs each of the touch components.

Basic Principle of Capacitive Touch Detection

Figure 2:
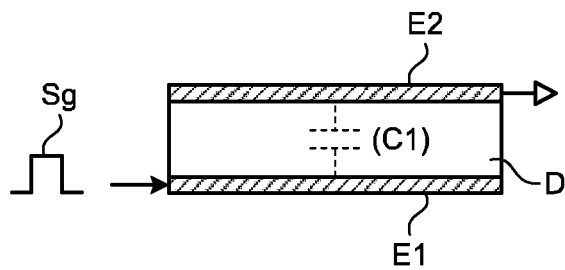
FIG. 2 is an explanatory diagram for explaining the basic principle of a capacitive touch detection method, the diagram illustrating a state in which a finger is neither in contact with nor in proximity to a detection device.
Figure 3:
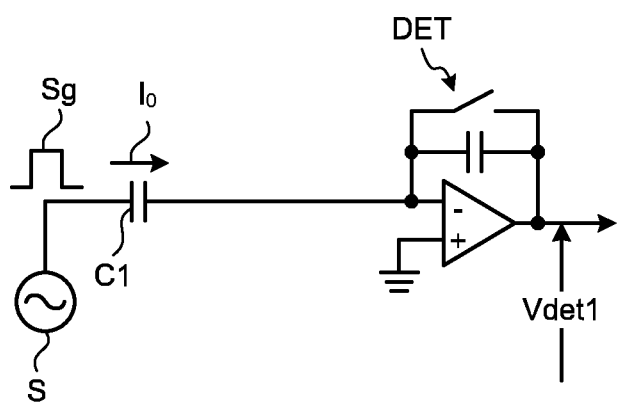
FIG. 3 is an explanatory diagram illustrating an exemplary equivalent circuit in the state illustrated in FIG. 2 in which the finger is neither in contact with nor in proximity to the detection device.
Figure 4:
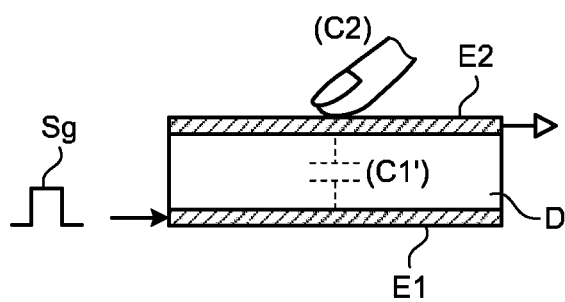
FIG. 4 is an explanatory diagram for explaining the basic principle of the capacitive touch detection method, the diagram illustrating a state in which the finger is in contact with or in proximity to the detection device.
Figure 5:
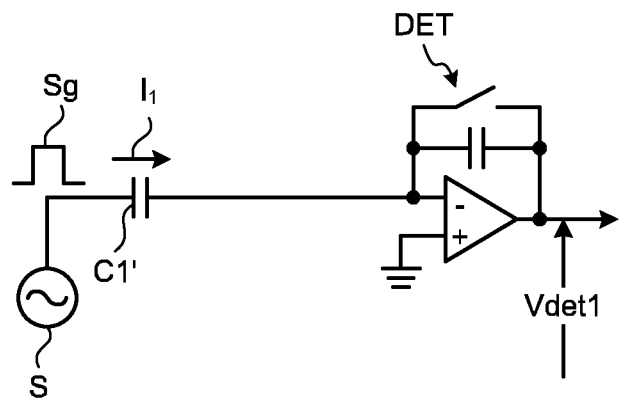
FIG. 5 is an explanatory diagram illustrating the exemplary equivalent circuit in the state illustrated in FIG. 4 in which the finger is in contact with or in proximity to the detection device.

The detection device 30 operates based on the basic principle of capacitive proximity detection, and outputs the detection signals Vdet. The following describes the basic principle of the touch detection in the display unit with a touch detection function 10 according to the first embodiment with reference to FIGS. 1 to 6. FIG. 2 is an explanatory diagram for explaining the basic principle of the capacitive touch detection method, the diagram illustrating a state in which an external object, such as a finger, is neither in contact with nor in proximity to the detection device. FIG. 3 is an explanatory diagram illustrating an exemplary equivalent circuit in the state illustrated in FIG. 2 in which the finger is neither in contact with nor in proximity to the detection device. FIG. 4 is an explanatory diagram for explaining the basic principle of the capacitive touch detection method, the diagram illustrating a state in which the finger is in contact with or in proximity to the detection device. FIG. 5 is an explanatory diagram illustrating the exemplary equivalent circuit in the state illustrated in FIG.

Figure 6:
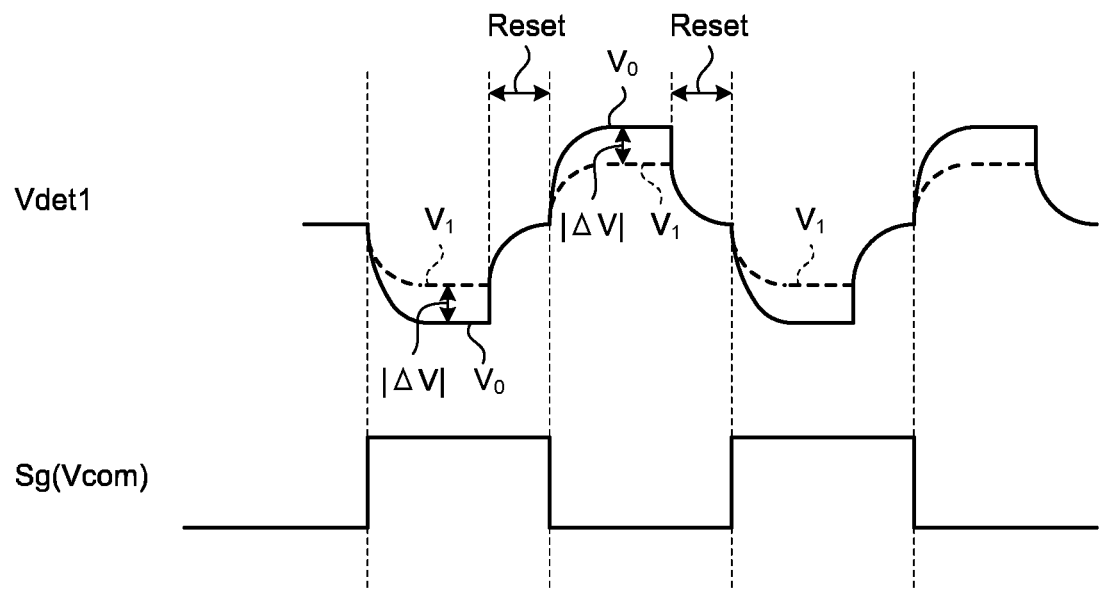
FIG. 6 is a diagram illustrating exemplary waveforms of a drive signal and a detection signal.

4 in which the finger is in contact with or in proximity to the detection device. FIG. 6 is a diagram illustrating exemplary waveforms of a drive signal and a detection signal. The external object only needs to be an object that generates an electrostatic capacitance (to be described later), and is, for example, the finger mentioned above or a stylus. The present embodiment will be described by exemplifying the finger as the external object.

For example, as illustrated in FIGS. 3 and 5, a capacitive element C1 and a capacitive element C1' respectively include a drive electrode E1 and a detection electrode E2 as a pair of electrodes that are arranged opposite to each other with a dielectric material D interposed therebetween. As illustrated in FIG. 3, the capacitive element C1 is coupled, at one end thereof, to an alternating-current signal source (drive signal source) S, and coupled, at the other end thereof, to a voltage detector (touch detector) DET. The voltage detector DET is, for example, an integration circuit included in the detection signal amplifier 42 illustrated in FIG. 1.

When an alternating-current (AC) rectangular wave Sg having a predetermined frequency (such as substantially several kilohertz to several hundred kilohertz) is applied from the alternating-current signal source S to the drive electrode E1 (one end of the capacitive element C1), an output waveform (detection signal Vdet1) appears through the voltage detector DET coupled to the detection electrode E2 side (the other end of the capacitive element C1).

In the state where the finger is not in contact with (or in proximity to) the detection electrode (non-contact state), a current $I_0$ corresponding to the capacitance value of the capacitive element C1 flows in association with charge and discharge of the capacitive element C1, as illustrated in FIGS. 2 and 3. As illustrated in FIG. 6, the voltage detector DET converts a variation in the current $I_0$ corresponding to the AC rectangular wave Sg into a variation in voltage (waveform $V_0$ represented by a solid line).

In the state where the finger is in contact with (or in proximity to) the detection electrode (contact state), an electrostatic capacitance C2 generated by the finger is in contact with or in proximity to the detection electrode E2, as illustrated in FIG. 4. As a result, a fringe component of the electrostatic capacitance between the drive electrode E1 and the detection electrode E2 is interrupted. This interruption reduces the capacitance value of the capacitive element C1' to a value lower than that of the capacitive element C1. Referring to the equivalent circuit illustrated in FIG. 5, a current $I_1$ flows through the capacitive element C1'. The voltage detector DET converts a variation in the current $I_1$ corresponding to the AC rectangular wave Sg into a variation in voltage (waveform $V_1$ represented by a dotted line), as illustrated in FIG. 6. In this case, the waveform $V_1$ has a smaller amplitude than that of the waveform $V_0$ mentioned above. As a result, an absolute value $|\Delta V|$ of a voltage difference between the waveforms $V_0$ and $V_1$ changes according to an influence of the object, such as the finger, approaching from the outside. The voltage detector DET desirably detects the absolute value $|\Delta V|$ of the voltage difference between the waveforms $V_0$ and $V_1$ with high accuracy. For this purpose, a period Reset is more preferably provided during which the charge/discharge of the capacitor is reset by switching in the circuit in accordance with the frequency of the AC rectangular wave Sg.

The detection device 30 illustrated in FIG. 1 performs the touch detection by sequentially scanning one detection block at a time according to the drive signals Vcom supplied from the drive electrode driver 14.

The detection device 30 outputs the detection signals Vdet1 on a detection-block-by-detection-block basis from a plurality of detection electrodes TDL (to be described later) through the voltage detector DET illustrated in FIG. 3 or 5. The detection signals Vdet1 thus output are supplied to the A/D converter 43 of the touch detector 40.

The A/D converter 43 is a circuit that samples analog signals output from the detection signal amplifier 42 at intervals synchronized with the drive signals Vcom, and converts the sampled analog signals into digital signals.

The signal processor 44 includes a digital filter that reduces frequency components (noise components) included in the output signals of the A/D converter 43 other than those of the frequency at which the drive signals Vcom are sampled. The signal processor 44 is a logic circuit that detects, based on the output signals of the A/D converter 43, whether the detection device 30 is touched. The signal processor 44 performs processing to extract only a difference voltage caused by the finger. This difference voltage caused by the finger corresponds to the absolute value $|\Delta V|$ of the difference between the waveforms $V_0$ and $V_1$ described above. The signal processor 44 may perform a calculation of averaging the absolute values $|\Delta V|$ for each detection block to obtain the average value of the absolute values $|\Delta V|$. By doing this, the signal processor 44 can reduce the influence of the noise. The signal processor 44 compares the detected difference voltage caused by the finger with a predetermined threshold voltage, and determines that the finger approaching from the outside is in the contact state if the difference voltage is equal to or higher than the threshold voltage, or determines that the finger is in the non-contact state if the difference voltage is lower than the threshold voltage. In this manner, the touch detector 40 can perform the touch detection.

The coordinate extractor 45 is a logic circuit that obtains touchscreen panel coordinates of a touch when the touch is detected by the signal processor 44. The detection timing controller 46 controls the A/D converter 43, the signal processor 44, and the coordinate extractor 45 so as to operate them in synchronization with one another. The coordinate extractor 45 outputs the touchscreen panel coordinates as a signal output Vout.

Figure 7:
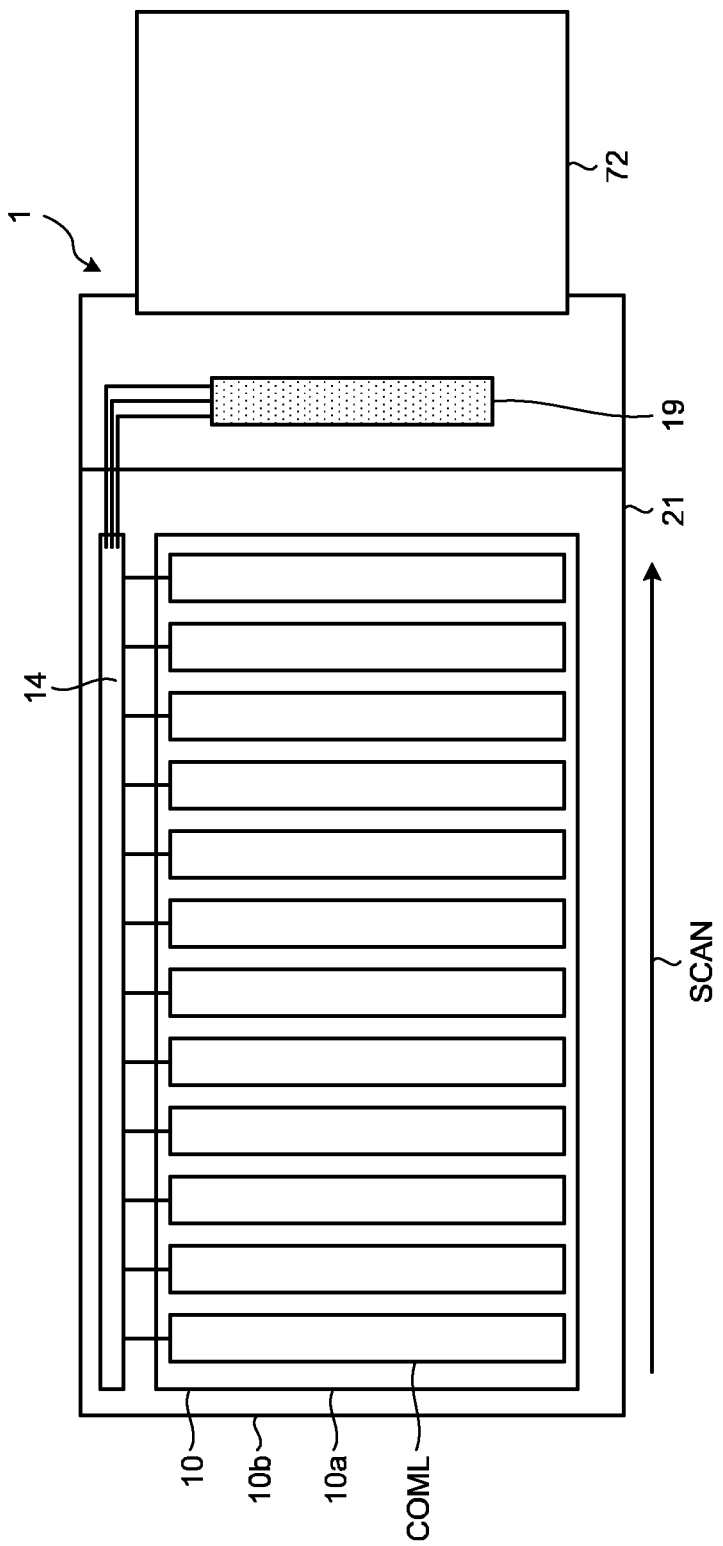
FIG. 7 is a view illustrating an exemplary module on which the display device with a touch detection function is mounted.
Figure 8:
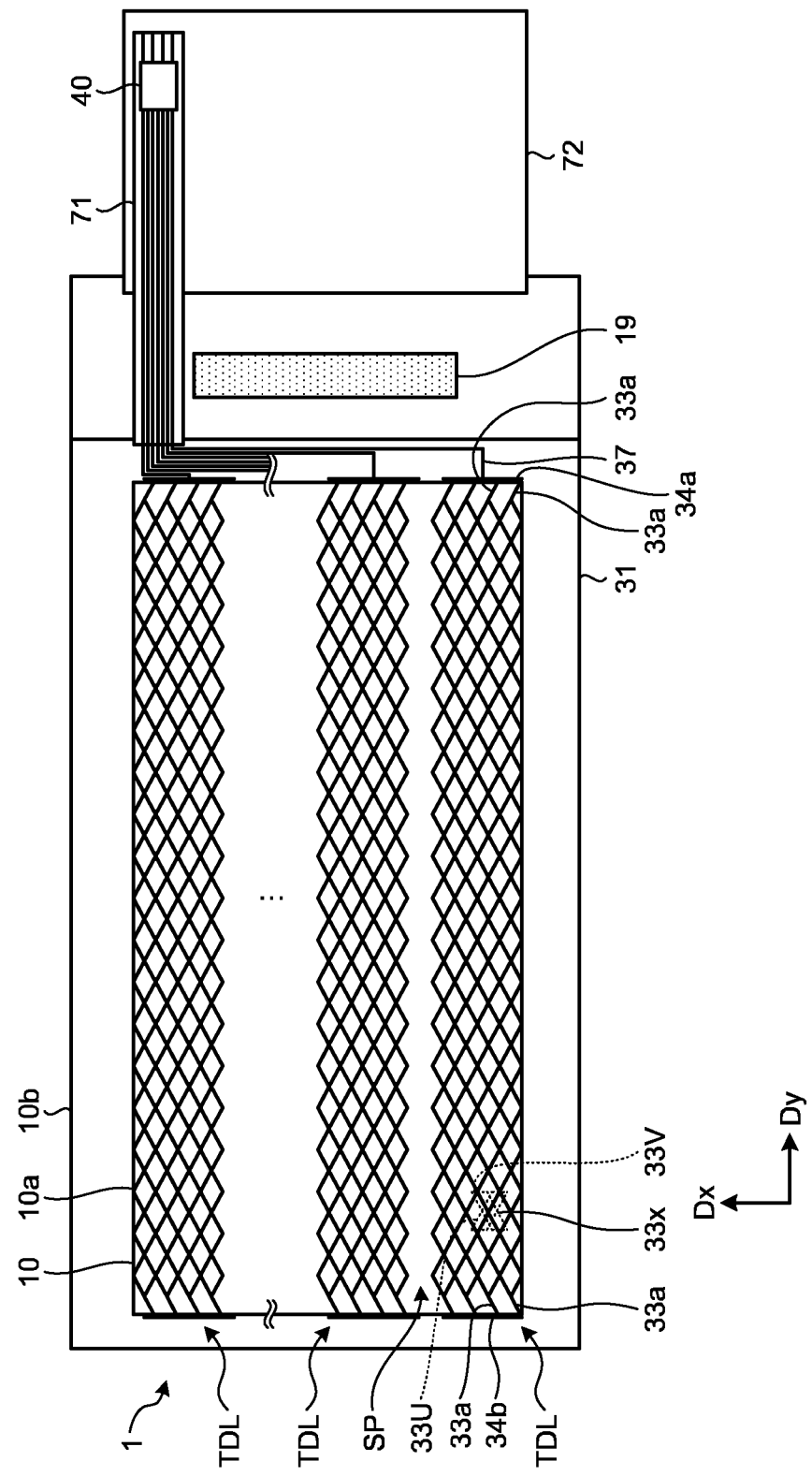
FIG. 8 is a view illustrating the exemplary module on which the display device with a touch detection function is mounted.

FIGS. 7 and 8 are plan views illustrating an exemplary module on which the display device with the touch detection function according to the first embodiment is mounted. FIG. 7 is a plan view illustrating an example of the drive electrodes. FIG. 8 is a plan view illustrating an example of the detection electrodes.

As illustrated in FIG. 7, the display device with a touch detection function 1 includes a thin-film transistor (TFT) substrate 21 and a flexible printed circuit board 72. A chip on glass (COG) 19 is mounted on the TFT substrate 21, on which areas corresponding to a display region 10a of the display device 20 (refer to FIG. 1) and a frame region 10b surrounding the display region 10a are formed. The COG 19 is a chip of an integrated-circuit (IC) driver mounted on the TFT substrate 21, and incorporates circuits necessary for display operations, such as the controller 11, the gate driver 12, and the source driver 13 illustrated in FIG. 1. In the present embodiment, the gate driver 12, the source driver 13, or the drive electrode driver 14 may be formed on the TFT substrate 21 that is a glass substrate. The COG 19 and the drive electrode driver 14 are provided in the frame region 10b. The COG 19 may incorporate the drive electrode driver 14. In this case, the frame region 10b can be narrowed. The flexible printed circuit board 72 is coupled to the COG 19, and the video signal Vdisp and a power supply voltage are externally supplied to the COG 19 through the flexible printed circuit board 72.

As illustrated in FIG. 7, an area of the display unit with a touch detection function 10 overlapping the display region 10*a* is provided with the drive electrodes COML. The drive electrodes COML respectively extend in a direction along one side of the display region 10*a*, and are arranged with spaces provided therebetween in a direction along another side intersecting one side of the display region 10*a*. Each of the drive electrodes COML is coupled to the drive electrode driver 14.

As illustrated in FIG. 8, the display device with a touch detection function 1 further includes a substrate 31 and a flexible printed circuit board 71. The touch detector 40 described above is mounted on the flexible printed circuit board 71. The touch detector 40 may be mounted on another board coupled to the flexible printed circuit board 71, instead of being mounted on the flexible printed circuit board 71. The substrate 31 is, for example, a light-transmitting glass substrate, and faces the TFT substrate 21 in a direction orthogonal to a surface of the TFT substrate 21 illustrated in FIG. 7. As illustrated in FIG. 8, an area of the display unit with a touch detection function 10 overlapping the display region 10*a* is provided with the detection electrodes TDL. The detection electrodes TDL respectively extend in a direction intersecting the extending direction of the drive electrodes COML illustrated in FIG. 7. As illustrated in FIG. 8, a space SP is present between each adjacent pair of the detection electrodes TDL. The detection electrodes TDL are arranged with the spaces provided therebetween in the extending direction of the drive electrodes COML. That is to say, the drive electrodes COML and the detection electrodes TDL are arranged so as to three-dimensionally intersect each other, and generate electrostatic capacitances at parts overlapping each other.

When performing the display operation, the display device with a touch detection function 1 sequentially scans one horizontal line at a time, as will be described later. In other words, the display device with a touch detection function 1 performs the display scanning parallel to a direction along one side of the display unit with a touch detection function 10 (refer to FIG. 8). When performing the touch detection operation, the display device with a touch detection function 1 sequentially scans one detection line at a time by sequentially applying the drive signals Vcom from the drive electrode driver 14 to the drive electrodes COML. In other words, the display unit with a touch detection function 10 performs the scanning in a direction SCAN parallel to a direction along another side intersecting one side of the display unit with a touch detection function 10 (refer to FIG. 7).

As illustrated in FIG. 8, each of the detection electrodes TDL according to the present embodiment includes a plurality of first conductive thin wires 33U and a plurality of second conductive thin wires 33V. The first conductive thin wires 33U and the second conductive thin wires 33V are inclined in directions opposite to each other with respect to a direction parallel to one side of the display region 10*a*.

The first and second conductive thin wires 33U and 33V have each a small width, and are arranged in the display region 10*a* with spaces provided therebetween in a direction intersecting the extending directions of the first and second conductive thin wires 33U and 33V (in the short side direction of the display region 10*a*). Both ends in the extending direction of each of the first and second conductive thin wires 33U and 33V are coupled to connection wiring lines 34*a* and 34*b* disposed in the frame region 10*b*. As a result, the first and second conductive thin wires 33U and 33V are electrically coupled to one another, and serve as each of the detection electrodes TDL. A wiring line 37 is coupled to each of the connection wiring lines 34*a*, and thus, the detection electrodes TDL are coupled to the flexible printed circuit board 71 through the wiring line 37. The detection electrodes TDL may be partially disposed outside the display region 10*a* (in the frame region 10*b*). The connection wiring lines 34*a* and 34*b* may be disposed in the display region 10*a*, instead of being disposed in the frame region 10*b*. The connection wiring lines 34*a* and 34*b* may be coupled to the touch detector 40 through the wiring line 37 to serve as wiring lines for coupling the first and second conductive thin wires 33U and 33V to the touch detector 40.

Figure 9:
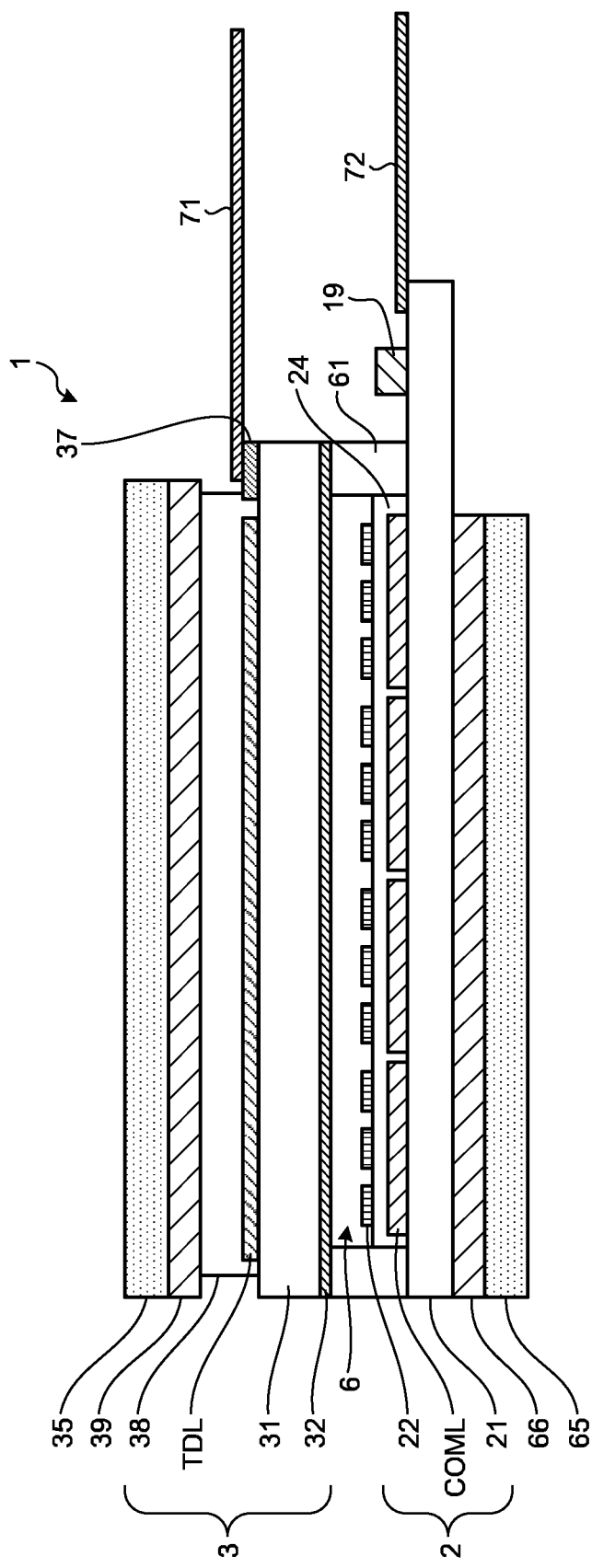
FIG. 9 is a sectional view illustrating a schematic sectional structure of the display device with a touch detection function according to the first embodiment.

FIG. 9 is a sectional view illustrating a schematic sectional structure of the display device with a touch detection function. As illustrated in FIG. 9, the display unit with a touch detection function 10 includes a pixel substrate 2, a counter substrate 3 that is disposed so as to face a surface of the pixel substrate 2 in a direction orthogonal thereto, and a liquid crystal layer 6 that is provided between the pixel substrate 2 and the counter substrate 3.

The pixel substrate 2 includes the TFT substrate 21 serving as a circuit substrate, a plurality of pixel electrodes 22 that are arranged in a matrix above the TFT substrate 21, the drive electrodes COML that are formed between the TFT substrate 21 and the pixel electrodes 22, and an insulating layer 24 that insulates the pixel electrodes 22 from the drive electrodes COML. A polarizing plate 65 is provided below the TFT substrate 21 with an adhesive layer 66 interposed therebetween.

The counter substrate 3 includes the substrate 31 and a color filter 32 formed on one surface of the substrate 31. The detection electrodes TDL of the detection device 30 are formed on the other surface of the substrate 31. As illustrated in FIG. 9, the detection electrodes TDL are provided above the substrate 31. In addition, a protective layer 38 for protecting the first and second conductive thin wires 33U and 33V of the detection electrodes TDL is provided above the detection electrodes TDL. A light-transmitting resin, such as an acrylic resin, can be used for the protective layer 38. A polarizing plate 35 is provided above the protective layer 38 with an adhesive layer 39 interposed therebetween.

The TFT substrate 21 and the substrate 31 are arranged so as to face each other with a predetermined space provided by a spacer 61. The liquid crystal layer 6 is provided in a space surrounded by the TFT substrate 21, the substrate 31, and the spacer 61. The liquid crystal layer 6 modulates light passing therethrough according to the state of an electric field, and includes, for example, liquid crystals of a horizontal electric field mode, such as an in-plane switching (IPS) mode and a fringe field switching (FFS) mode, to be used in a display panel. Orientation films may be provided between the liquid crystal layer 6 and the pixel substrate 2 and between the liquid crystal layer 6 and the counter substrate 3 illustrated in FIG. 9.

Figure 10:
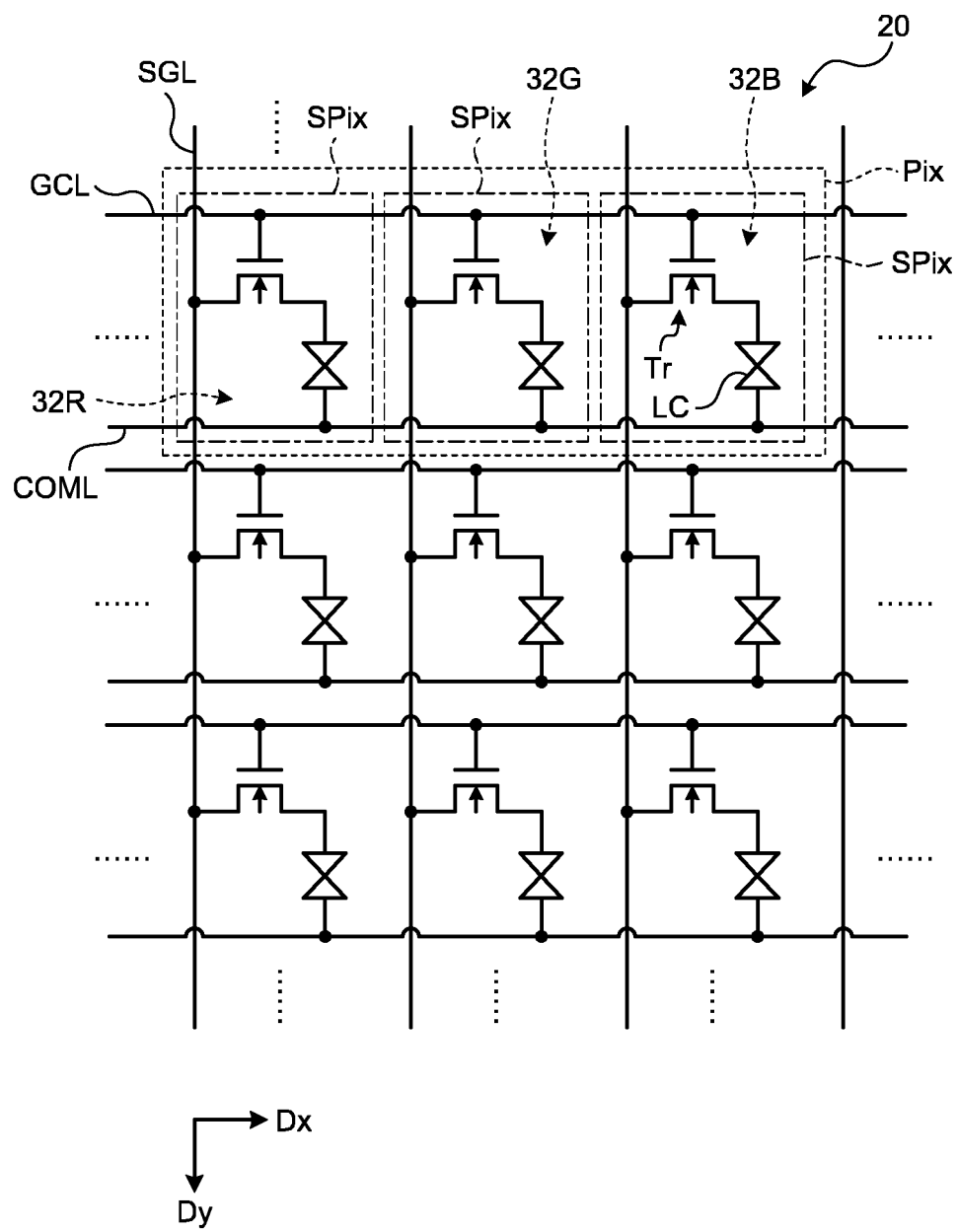
FIG. 10 is a circuit diagram illustrating a pixel arrangement of the display device with a touch detection function according to the first embodiment.

FIG. 10 is a circuit diagram illustrating a pixel arrangement of the display device with a touch detection function according to the first embodiment. The TFT substrate 21 illustrated in FIG. 9 is provided with thin-film transistor elements (hereinafter, called TFT elements) Tr of the respective sub-pixels SPix and wiring lines, such as pixel signal lines SGL that supply the pixel signals Vpix to the respective pixel electrodes 22 and scan signal lines GCL that drive the respective TFT elements Tr, as illustrated in FIG. 10. The pixel signal lines SGL and the scan signal lines GCL extend in a plane parallel to the surface of the TFT substrate 21. A direction Dx represents a direction orthogonal to the arrangement direction of the sub-pixels SPix (extending direction of the scan signal lines GCL), and a direction Dy represents the arrangement direction of the sub-pixels SPix (extending direction of the pixel signal lines SGL), as illustrated in FIG. 10. In the present embodiment, the direction Dy corresponds to a direction in which color regions providing the highest human visibility (to be described later) are arranged, and the direction Dx corresponds to a direction orthogonal to the direction Dy in a plane parallel to a surface of the counter substrate 3.

The display device 20 illustrated in FIG. 10 includes the sub-pixels SPix arranged in a matrix. Each of the sub-pixels SPix includes corresponding one of the TFT elements Tr and a liquid crystal element LC. The TFT element Tr is constituted by a thin-film transistor, and in this example, constituted by an n-channel metal oxide semiconductor (MOS) TFT. In the TFT element Tr, one of the source and the drain is coupled to one of the pixel signal lines SGL, the gate is coupled to one of the scan signal lines GCL, and the other of the source and the drain is coupled to one end of the liquid crystal element LC. The liquid crystal element LC is coupled at one end thereof to the source or the drain of the TFT element Tr, and at the other end thereof to one of the drive electrodes COML.

The sub-pixel SPix is mutually coupled through the scan signal line GCL with other sub-pixels SPix belonging to the same row of the display device 20. The scan signal line GCL is coupled to the gate driver 12 (refer to FIG. 1), and is supplied with the scan signal Vscan from the gate driver 12. The sub-pixel SPix is mutually coupled through the pixel signal line SGL with other sub-pixels SPix belonging to the same column of the display device 20. The pixel signal line SGL is coupled to the source driver 13 (refer to FIG. 1), and is supplied with the pixel signal Vpix from the source driver 13. The sub-pixel SPix is further mutually coupled through the drive electrode COML with other sub-pixels SPix belonging to the same row. The drive electrode COML is coupled to the drive electrode driver 14 (refer to FIG. 1), and is supplied with one of the drive signals Vcom from the drive electrode driver 14. This means that the sub-pixels SPix belonging to the same one of the rows share one of the drive electrodes COML in this example. The drive electrodes COML according to the present embodiment extend parallel to the direction of extension of the scan signal lines GCL. The direction of extension of the drive electrodes COML according to the present embodiment is not limited to this direction. The direction of extension of the drive electrodes COML may be, for example, a direction parallel to the direction of extension of the pixel signal lines SGL.

The gate driver 12 illustrated in FIG. 1 drives the scan signal lines GCL so as to sequentially scan them. The scan signal Vscan (refer to FIG. 1) is applied to the gates of the TFT elements Tr of the sub-pixels SPix through the scan signal line GCL, and thus, one horizontal line of the sub-pixels SPix is sequentially selected as a target of display driving. In the display device with a touch detection function 1, the source driver 13 supplies the pixel signals Vpix to the sub-pixels SPix belonging to one horizontal line so as to display one horizontal line at a time. While this display operation is performed, the drive electrode driver 14 applies the drive signal Vcom to the drive electrode COML corresponding to the horizontal line.

A color region 32R, a color region 32G, and a color region 32B of the color filter colored in three colors of, for example, red (R), green (G), and blue (B) are cyclically arranged in the color filter 32 illustrated in FIG. 9. The color regions 32R, 32G, and 32B of the three colors of R, G, and B are associated, as one set, with the sub-pixels SPix described above illustrated in FIG. 10. The color regions 32R, 32G, and 32B constitute a pixel Pix, as one set. As illustrated in FIG. 9, the color filter 32 faces the liquid crystal layer 6 in a direction orthogonal to the TFT substrate 21. The color filter 32 may have a combination of other colors as long as being colored in different colors from each other. The color filter 32 is not limited to having a combination of three colors, but may have a combination of four or more colors.

Figure 11:
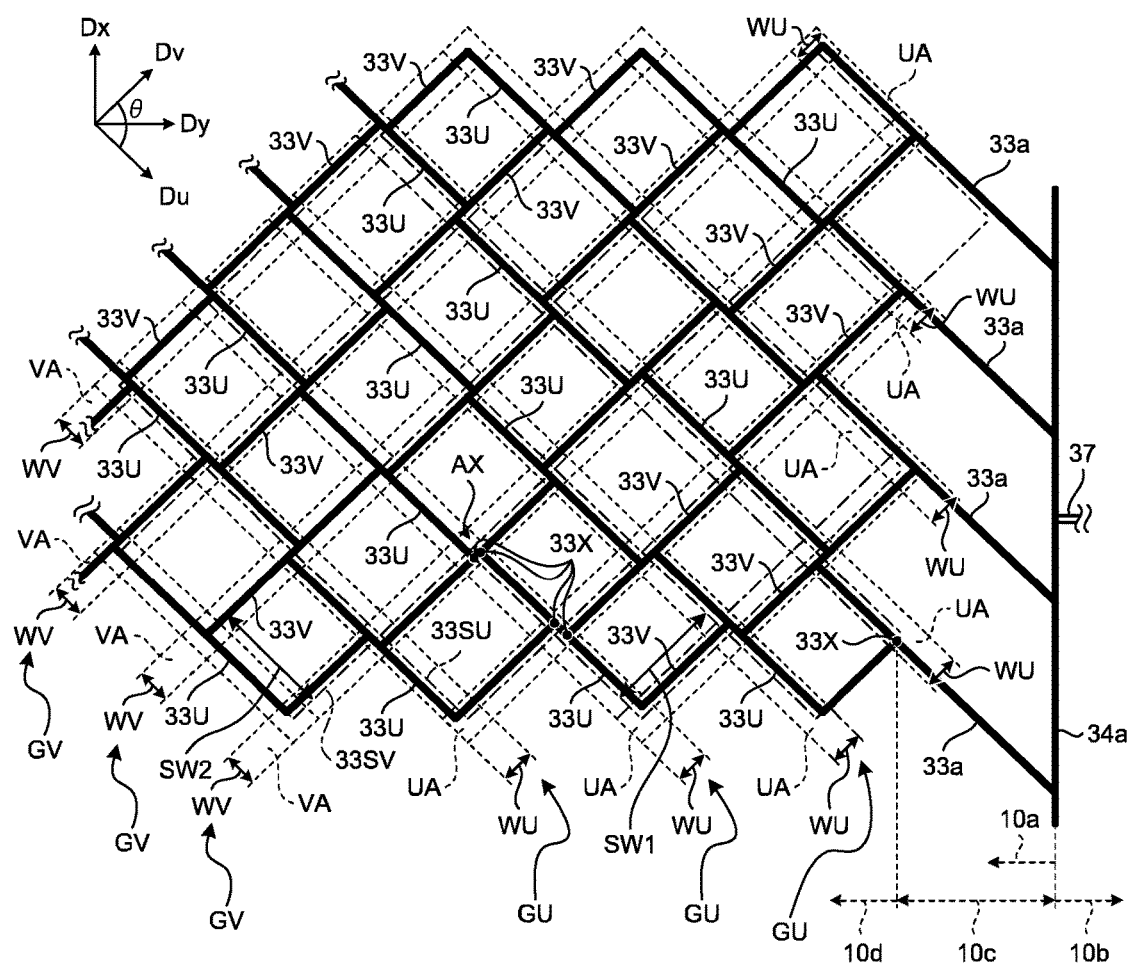
FIG. 11 is a plan view of a detection electrode according to the first embodiment.

FIG. 11 is a plan view of one of the detection electrodes according to the first embodiment. The view of one of the detection electrodes TDL illustrated in FIG. 11 is a partially enlarged view of the detection electrodes TDL illustrated in FIG. 8. Although the detection electrode TDL illustrated in FIG. 8 appears to have a uniform pattern of parallelograms, the detection electrode TDL actually has a shape illustrated in FIG. 11.

The first and second conductive thin wires 33U and 33V are formed of one or more layers of metals selected from aluminum (Al), copper (Cu), silver (Ag), molybdenum (Mo), chromium (Cr), and tungsten (W). Alternatively, the first and second conductive thin wires 33U and 33V are formed of an alloy of metallic materials including one or more types selected from aluminum (Al), copper (Cu), silver (Ag), molybdenum (Mo), chromium (Cr), and tungsten (W). The first and second conductive thin wires 33U and 33V may be a layered product obtained by stacking a plurality of conductive layers of metallic materials including one or more types selected from aluminum (Al), copper (Cu), silver (Ag), molybdenum (Mo), chromium (Cr), and tungsten (W), or of alloys containing one or more types of these materials. The first and second conductive thin wires 33U and 33V may be laminated with a conductive layer of a light-transmitting conductive oxide, such as an indium tin oxide (ITO), in addition to the conductive layers of metallic materials or alloys thereof described above. The first and second conductive thin wires 33U and 33V may be laminated with a blackened film, a black organic film, or a black conductive organic film obtained by combining the metallic materials and the conductive layers described above.

The metallic materials described above are lower in resistance than the light-transmitting conductive oxide, such as an ITO, as a material for transparent electrodes. The metallic materials described above are higher in light-shielding property than the light-transmitting conductive oxide, and hence may reduce transmittance or make the pattern of the detection electrode TDL visible. In the present embodiment, one detection electrode TDL has a plurality of first conductive thin wires 33U and a plurality of second conductive thin wires 33V respectively having a small width, and the first and second conductive thin wires 33U and 33V are arranged with spaces provided therebetween, each of the spaces being wider than the wire width. Thus, a lower resistance and invisibility of the conductive thin wires can be achieved. As a result, the resistance of the detection electrodes TDL is reduced, and the display device with a touch detection function 1 can have a smaller thickness, a larger screen, and a higher resolution.

The width of each of the first and second conductive thin wires 33U and 33V is preferably 1 μm to 10 μm, and more preferably in the range of 1 μm to 5 μm. This is because setting the width of each of the first and second conductive thin wires 33U and 33V to a value equal to or smaller than 10 μm reduces the area covering openings that serve as regions of the display region 10a through which transmission of light is not reduced by a black matrix or by the scan signal lines GCL and the pixel signal lines SGL (to be described later), and thus reduces the possibility of reduction in aperture ratio. This is also because setting the width of each of the first and second conductive thin wires 33U and 33V to a value equal to or larger than 1 μm stabilizes the shape thereof, and thus reduces the possibility of wire disconnection.

Referring to FIGS. 8, 10, and 11, the detection electrode TDL is formed by arranging the first and second conductive thin wires 33U and 33V at predetermined intervals, and extends as a whole in a direction parallel to the extending direction of the color regions 32R, 32G, and 32B of the color filter 32. In other words, the detection electrode TDL extends in a direction parallel to the direction Dy in which the pixel signal lines SGL illustrated in FIG. 10 extend. To prevent the first and second conductive thin wires 33U and 33V from shielding the light through a particular color region of the color filter 32, the first and second conductive thin wires 33U and 33V have a mesh shape in which thin wire pieces inclining in mutually opposite directions are connected together in an intersecting manner. The first and second conductive thin wires 33U and 33V are inclined in directions Du and Dv opposite to each other so as to respectively form an angle θ with the direction parallel to the extending direction of the color regions 32R, 32G, and 32B (direction Dy). Electrical coupling parts 33x are formed at places where the first and second conductive thin wires 33U and 33V are electrically coupled together. The angle θ is, for example, 5 to 75 degrees, preferably 25 to 40 degrees, and more preferably 50 to 65 degrees.

In this manner, the detection electrode TDL includes one or more of the first conductive thin wires 33U extending in the direction Du and one or more of the second conductive thin wires 33V intersecting the first conductive thin wires 33U and extending in the direction Dv. In the state where the first conductive thin wires 33U intersect the second conductive thin wires 33V, one mesh of the detection electrode TDL has a parallelogram shape.

In the present embodiment, assuming one of the electrical coupling parts 33x closest to the connection wiring line 34a as a boundary, an end region 10c of the detection electrode TDL is defined as a region that lies closer to the connection wiring line 34a than the electrical coupling part 33x closest to the connection wiring line 34a and that ranges from the electrical coupling part 33x closest to the connection wiring line 34a to the connection wiring line 34a (refer to FIG. 11). In the same manner, a main detection region 10d of the detection electrode TDL is defined as a region that lies farther from the connection wiring line 34a than the electrical coupling part 33x closest to the connection wiring line 34a.

The pattern of the detection electrode TDL near the connection wiring line 34a is line-symmetric or point-symmetric to the pattern of the detection electrode near the connection wiring line 34b, as illustrated in FIG. 8. As a result, assuming one of the electrical coupling parts 33x closest to the connection wiring line 34b as a boundary, an end region of the detection electrode TDL is defined as a region that lies closer to the connection wiring line 34b than the electrical coupling part 33x closest to the connection wiring line 34b and ranges to the connection wiring line 34b. In the same manner, the main detection region of the detection electrode TDL is defined as a region that lies farther from the connection wiring line 34b than the electrical coupling part 33x closest to the connection wiring line 34b.

As illustrated in FIG. 11, in the end region 10c of the detection electrode TDL, conductive thin wires 33a are disposed in positions to which the first conductive thin wires 33U extend, and thus, the connection wiring line 34a is electrically coupled to the first conductive thin wires 33U in the main detection region 10d through the conductive thin wires 33a.

Each of the drive electrodes COML illustrated in FIGS. 7 and 9 serves as a common electrode that applies a common potential to a plurality of pixel electrodes 22 of the display device 20, and also serves as a drive electrode when the touch detection using a mutual-capacitive method is performed on the detection device 30. The detection device 30 is constituted by the drive electrodes COML provided in the pixel substrate 2 and the detection electrodes TDL provided in the counter substrate 3.

The drive electrodes COML are divided into a plurality of electrode patterns extending in a direction parallel to the other side of the display region 10a illustrated in FIG. 7. The detection electrodes TDL are constituted by electrode patterns including a plurality of metallic wiring lines extending in a direction intersecting the extending direction of the electrode patterns of the drive electrodes COML. The detection electrodes TDL face the drive electrodes COML in the direction orthogonal to the surface of the TFT substrate 21 (refer to FIG. 9). Each of the electrode patterns of the detection electrodes TDL is coupled to an input to the detection signal amplifier 42 of the touch detector 40 (refer to FIG. 1). The electrode patterns of the drive electrodes COML and the detection electrodes TDL intersecting each other generate electrostatic capacitances at intersecting parts therebetween.

The drive electrodes COML are made using, for example, a light-transmitting electrically conductive material, such as an ITO. The detection electrodes TDL and the drive electrodes COML (drive electrode blocks) are not limited to having a plurality of divided stripe shapes. For example, the detection electrodes TDL and the drive electrodes COML may have comb-tooth shapes. Otherwise, the detection electrodes TDL and the drive electrodes COML only need to be divided into a plurality of portions. The shape of slits for dividing the drive electrodes COML may be linear or curved.

When the detection device 30 performs the touch detection operation using the mutual-capacitive method, the above-described configuration causes the drive electrode driver 14 to drive the drive electrodes so as to sequentially scan the drive electrode blocks in a time-division manner, and thereby, each detection block of the drive electrodes COML is sequentially selected. The detection signal Vdet1 is output from the detection electrode TDL, and thereby, the touch detection of each detection block is performed. That is to say, each of the drive electrode blocks corresponds to the drive electrode E1, and the detection electrode TDL corresponds to the detection electrode E2, in the basic principle of the mutual-capacitive touch detection described above. The detection device 30 detects the touch input according to this basic principle. The detection electrodes TDL and the drive electrodes COML three-dimensionally intersecting each other constitute a capacitive touch sensor in a matrix form. Consequently, by scanning the entire touch detection surface of the detection device 30, the detection device 30 can detect a position where a conductor externally comes in contact therewith or close thereto.

As an exemplary method of operation of the display device with a touch detection function 1, the display device with a touch detection function 1 performs the touch detection operation (in a detection period) and the display operation (in a display operation period) in a time-division manner. The division between the touch detection operation and the display operation may be made in any manner.

In the present embodiment, since the drive electrode COML serves also as the common electrode of the display device 20, the controller 11 supplies the drive signal Vcom serving as a common electrode potential for display to the drive electrode COML selected through the drive electrode driver 14 during the display operation period.

In the case performing the detection operation during the detection period using only the detection electrodes TDL without using the drive electrodes COML, if the touch detection is performed based on a self-capacitive touch detection principle described later, for example, the drive electrode driver 14 may supply the drive signal Vcom for touch detection to the detection electrodes TDL.

As described above, the extending direction of each of the first and second conductive thin wires 33U and 33V of the detection electrode TDL forms the angle θ with the extending direction of the color regions 32R, 32G, and 32B of the color filter 32 (direction Dy). As a result, the first and second conductive thin wires 33U and 33V of the detection electrode TDL shield the light through the color regions 32R, 32G, and 32B of the color filter 32 in a successive manner, and hence can reduce the drop in transmittance through a particular color region of the color filter 32. As a result, the detection device according to the first embodiment makes a brightness pattern difficult to have a certain periodicity, and thus can make a moire pattern less visible.

According to the technique described in JP-A-2014-041589, when visible light comes in, a light intensity pattern generated by diffraction or scattering of the light due to a plurality of detection electrodes forms nearly a plurality of scattered spots of light. A viewer can change the positions or number of the scattered spots of light of the light intensity pattern by tilting the detection device, but can hardly reduce the visibility of the spots of light of the light intensity pattern. According to the technique described in JP-A-2014-041589, the angle between adjacent thin wire pieces a and b is randomly formed. As a result, it is considered that the tilting of the detection device by the viewer is likely to generate new diffraction or scattering, and thus is likely to generate the scattered spots of light of the light intensity pattern.

In contrast, the first and second conductive thin wires 33U and 33V according to the first embodiment form the constant angle θ with the direction Dy. As a result, when visible light comes to the first and second conductive thin wires 33U and 33V, the light intensity pattern diffracted or scattered by the first and second conductive thin wires 33U and 33V is difficult to diffuse. In addition, the light intensity pattern diffracted or scattered by the first and second conductive thin wires 33U and 33V is likely to be concentrated in four directions, and thus, certain directivity is likely to be obtained. Thus, by tilting the detection device 30 according to the first embodiment, the viewer can easily avoid an angle likely to generate the light intensity pattern.

Consequently, the first conductive thin wires 33U according to the first embodiment are arranged in first strip-like regions UA respectively having a predetermined width WU, and a plurality of first groups GU are formed, each including at least two of the first conductive thin wires 33U displaced from one another in the direction Dv (refer to FIG. 11). In the first embodiment, the predetermined width WU and the predetermined width WV are also denoted as the first width WU and the second width WV.

In the same manner, the second conductive thin wires 33V according to the first embodiment are arranged in second strip-like regions VA each having a predetermined width WV, and a plurality of second groups GV are formed, each including at least two of the second conductive thin wires 33V displaced from one another in the direction Du (refer to FIG. 11).

Figure 12:
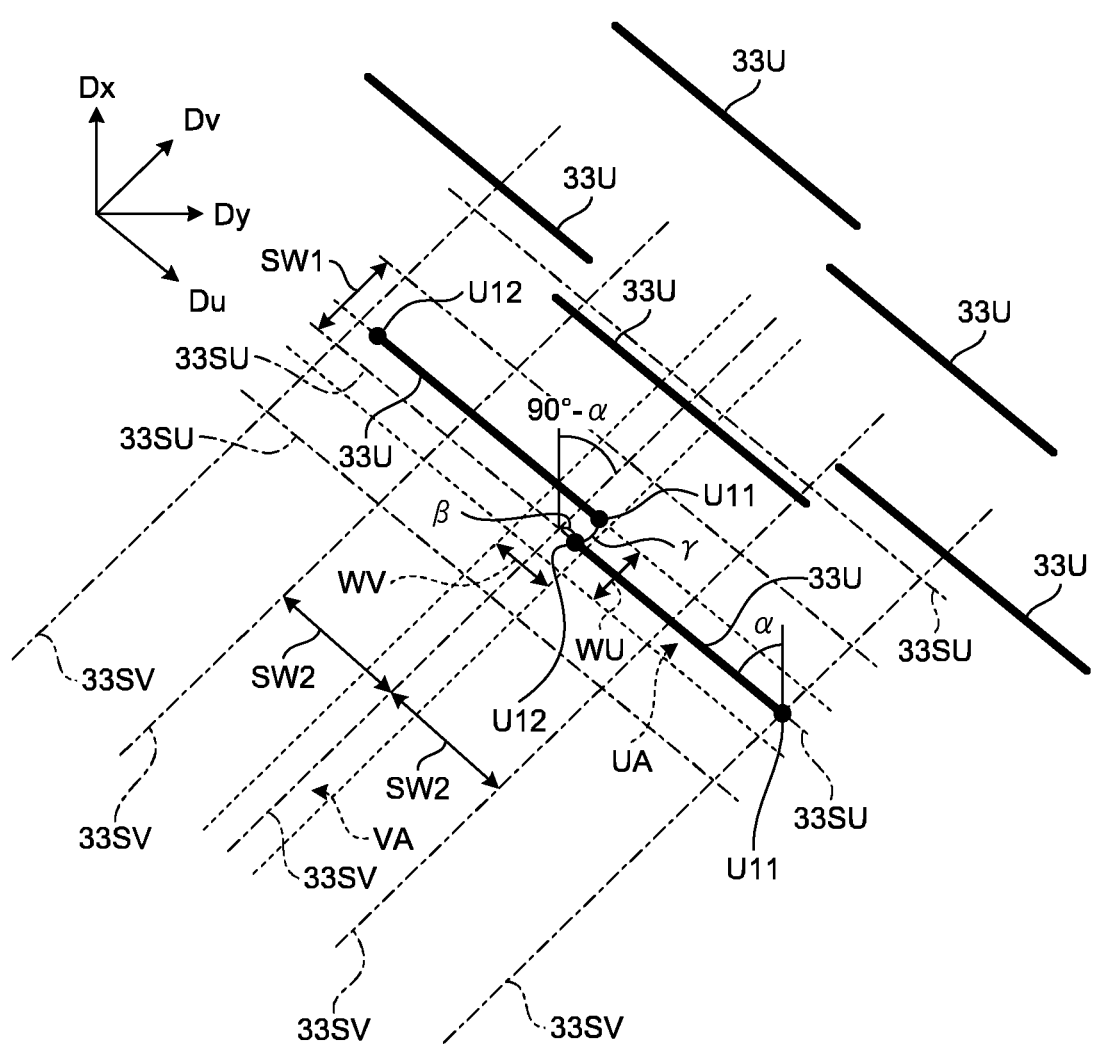
FIG. 12 is a process diagram for explaining an arrangement method for the detection electrode according to the first embodiment.

FIG. 12 is a process diagram for explaining an arrangement method for the detection electrode according to the first embodiment. A plurality of first reference lines 33SU illustrated in FIGS. 11 and 12 are imaginary lines that are arranged at even intervals in the direction Dv and extend in the direction Du. Each of the first reference lines 33SU is a straight line that bisects each of the first strip-like regions UA in the width direction thereof (in the direction Dv). In the same manner, a plurality of second reference lines 33SV are imaginary lines that are arranged at even intervals in the direction Du and extend in the direction Dv. Each of the second reference lines 33SV is a straight line that bisects each of the second strip-like regions VA in the width direction thereof (in the direction Du). Assuming the first reference line 33SU as the center of the predetermined width WU, the predetermined width WU is a width within which each of the first conductive thin wires 33U may be displaced from the first reference line 33SU. When a first reference length SW1 denotes the length between two of the first reference lines 33SU adjacent in the direction Dv, the predetermined width WU is one twentieth to one fifth of the first reference length SW1. For example, the predetermined width WU is 10 μm to 30 μm. Assuming the second reference line 33SV as the center of the predetermined width WV, the predetermined width WV is a width within which each of the second conductive thin wires 33V may be displaced from the second reference line 33SV. When a second reference length SW2 denotes the length between two of the second reference lines 33SV adjacent in the direction Du, the predetermined width WV is one twentieth to one fifth of the second reference length SW2. For example, the predetermined width WV is 10 μm to 30 μm.

That is to say, the length of each of the first conductive thin wires 33U is equal to or larger than the difference between twice the length between the adjacent second reference lines 33SV (second reference length SW2) described above and the predetermined width WV of the second strip-like regions VA. Also, the length of each of the first conductive thin wires 33U is equal to or smaller than the sum of twice the length between the adjacent second reference lines 33SV (second reference length SW2) and the predetermined width WV of the second strip-like regions VA. The length of each of the second conductive thin wires 33V is equal to or larger than the difference between twice the length between the adjacent first reference lines 33SU (first reference length SW1) described above and the predetermined width WU of the first strip-like regions UA. Also, the length of each of the second conductive thin wires 33V is equal to or smaller than the sum of twice the length between the adjacent first reference lines 33SU (first reference length SW1) and the predetermined width WU of the first strip-like regions UA.

As illustrated in FIG. 12, a first end U11 of each of the first conductive thin wires 33U is placed at a reference point. An angle α denotes the angle formed between the first conductive thin wire 33U and the direction Dx at the reference point. A second end U12 of the first conductive thin wire 33U is placed in a position apart in the direction Du from the first end U11 of the first conductive thin wire 33U by a distance of (twice the second reference length SW2)±(a length β). The length β is a randomly selected length within half the predetermined width WV. Once the position of the second end U12 of the first conductive thin wire 33U is determined, the first end U11 of the next first conductive thin wire 33U is placed in a position displaced by a randomly selected length γ within half the predetermined width WU in a direction forming an angle of (90°−α) with respect to the direction Dx from the position of the second end U12 of the first conductive thin wire 33U. The arranging method for the detection electrode TDL described above is repeated to arrange the first conductive thin wires 33U in each of the first strip-like regions UA extending along the direction Du while allowing the first conductive thin wires 33U to be displaced from one another in the direction Dv. The second conductive thin wires 33V can also be arranged in the same manner.

As illustrated in FIG. 11, the electrical coupling parts 33x where the first conductive thin wires 33U are in contact with the second conductive thin wires 33V are produced in intersection regions AX where the first strip-like regions UA intersect the second strip-like regions VA. Each of the intersection regions AX including two of the first conductive thin wires 33U displaced from each other in the direction Dv includes two of the electrical coupling parts 33x where two of the first conductive thin wires 33U are in contact with one of the second conductive thin wires 33V. Each of the intersection regions AX including two of the second conductive thin wires 33V displaced from each other in the direction Du includes two of the electrical coupling parts 33x where two of the second conductive thin wires 33V are in contact with one of the first conductive thin wires 33U. This arrangement leads to a reduction in places where the first conductive thin wires 33U crisscross the second conductive thin wires 33V.

That is to say, four electrical coupling parts 33x are formed in each of the first conductive thin wires 33U. In other words, four second conductive thin wires 33V are in contact with each of the first conductive thin wires 33U. Each of the first conductive thin wires 33U is in contact, at one end, the other end, and two intermediate locations thereof, with the second conductive thin wires 33V.

Four electrical coupling parts 33x are produced in each of the second conductive thin wires 33V. In other words, four first conductive thin wires 33U are in contact with each of the second conductive thin wires 33V. Each of the second conductive thin wires 33V is in contact, at one end, the other end, and two intermediate locations thereof, with the first conductive thin wires 33U.

Second Embodiment

Figure 13:
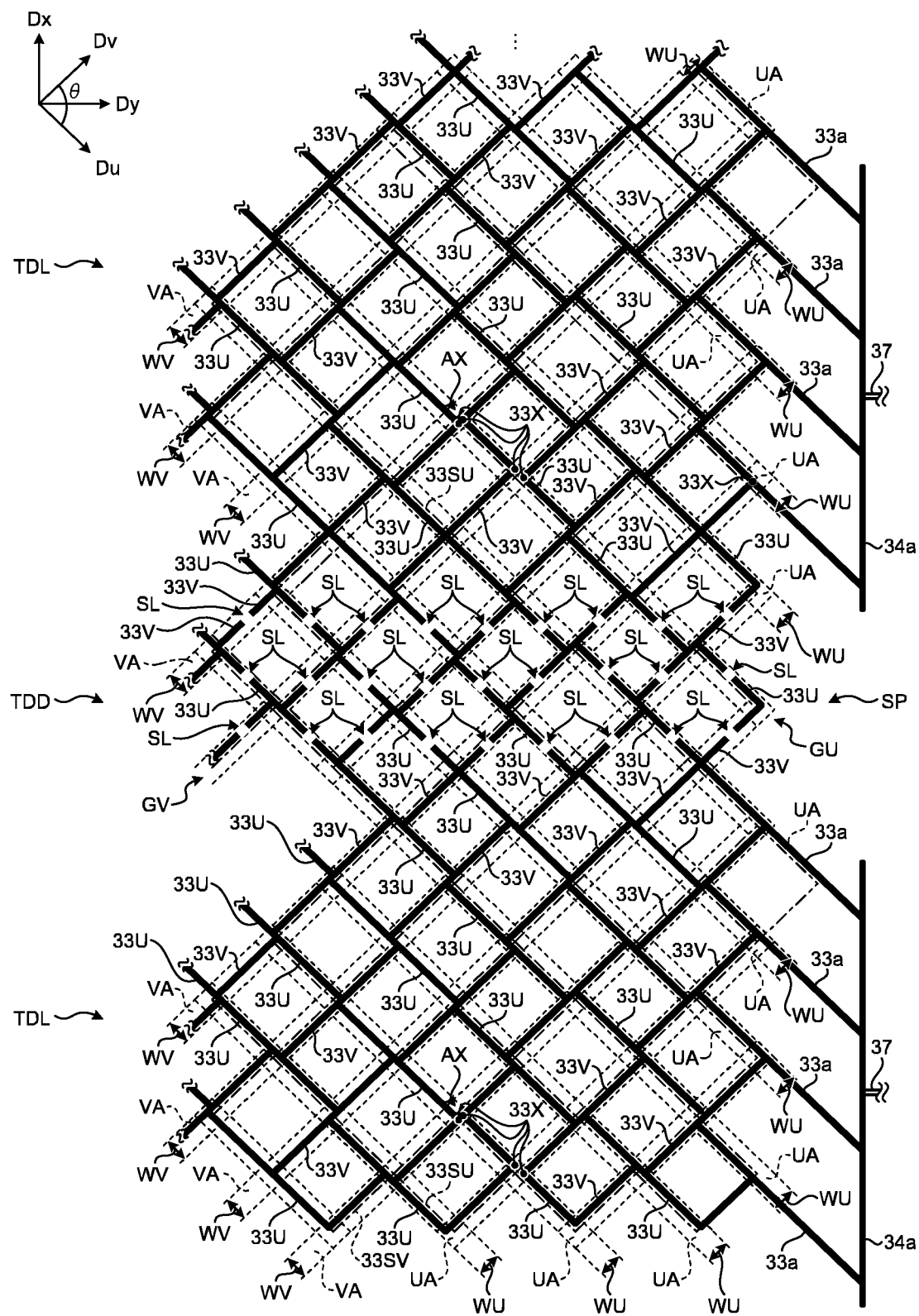
FIG. 13 is a plan view of the detection electrodes according to a second embodiment.

The following describes a detection device according to a second embodiment. FIG. 13 is a plan view of the detection electrodes according to the second embodiment. The same component as that described in the first embodiment above is denoted by the same reference numeral, and the description thereof will not be repeated.

As illustrated in FIG. 8, the space SP is present between each adjacent pair of the detection electrodes TDL. To restrain the space SP from being viewed by the viewer, a dummy electrode TDD is disposed, as illustrated in FIG. 13.

In the dummy electrode TDD, the first conductive thin wires 33U are arranged in the first strip-like regions UA respectively having the predetermined width WU, and the first groups GU are formed, each including at least two of the first conductive thin wires 33U displaced from one another in the direction Dv.

In the same manner, in the dummy electrode TDD, the second conductive thin wires 33V are arranged in the second strip-like regions VA respectively having the predetermined width WV, and the second groups GV are formed, each including at least two of the second conductive thin wires 33V displaced from one another in the direction Du.

In the dummy electrode TDD, a slit SL is provided at each of the first and second conductive thin wires 33U and 33V. The slit SL is a part in which the material constituting the first and second conductive thin wires 33U and 33V is not formed or is removed by, for example, etching, and only an insulating material is present. The slit SL is provided between adjacent electrical coupling parts 33x. The slit SL can be made hardly visible by setting the distance from the electrical coupling part 33x to the slit SL constant.

The dummy electrode TDD includes components extending in the same directions as those of the first and second conductive thin wires 33U and 33V constituting the detection electrode TDL. As a result, the space SP can be made invisible, and the detection electrode TDL can be made less visible.

First Modification of Second Embodiment

Figure 14:
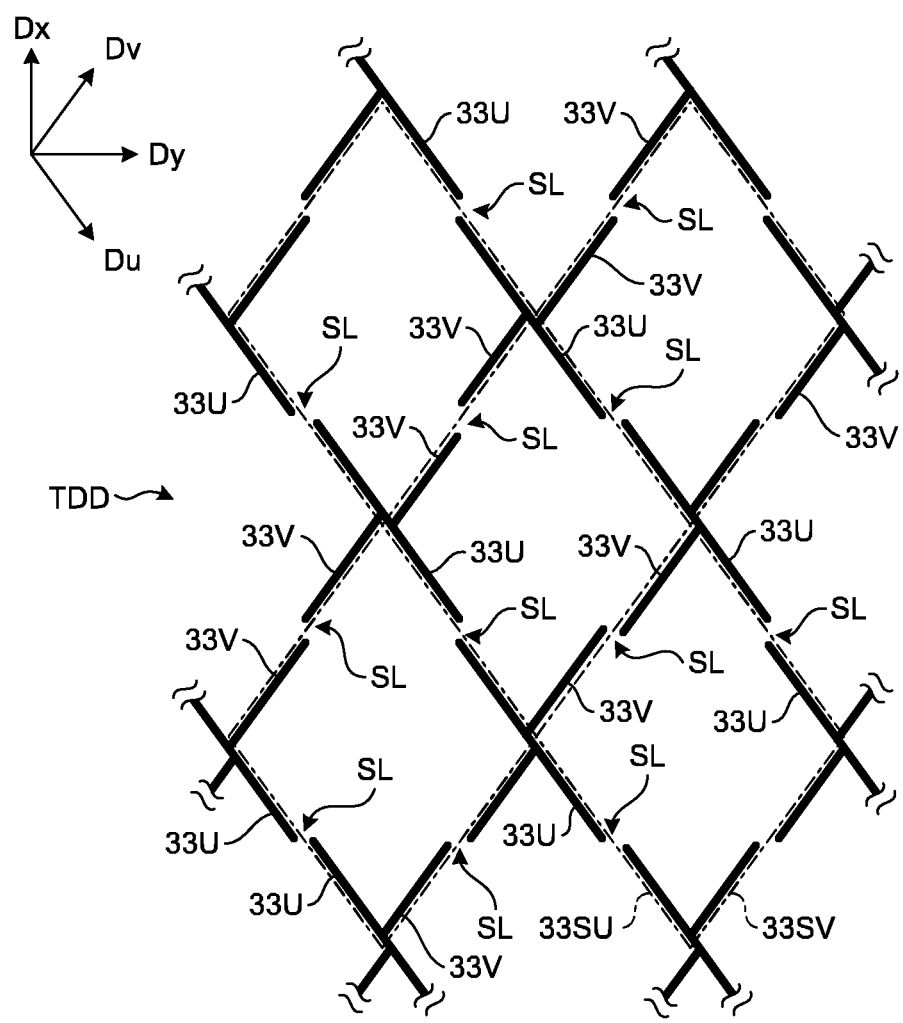
FIG. 14 is a plan view of the detection electrode according to a first modification of the second embodiment.

FIG. 14 is a plan view of the detection electrode according to a first modification of the second embodiment. As illustrated in FIG. 14, in the dummy electrode TDD, the first conductive thin wires 33U on both sides of the slit SL are displaced from each other in the direction Dv. In the same manner, in the dummy electrode TDD, the second conductive thin wires 33V on both sides of the slit SL are displaced from each other in the direction Du.

Second Modification of Second Embodiment

Figure 15:
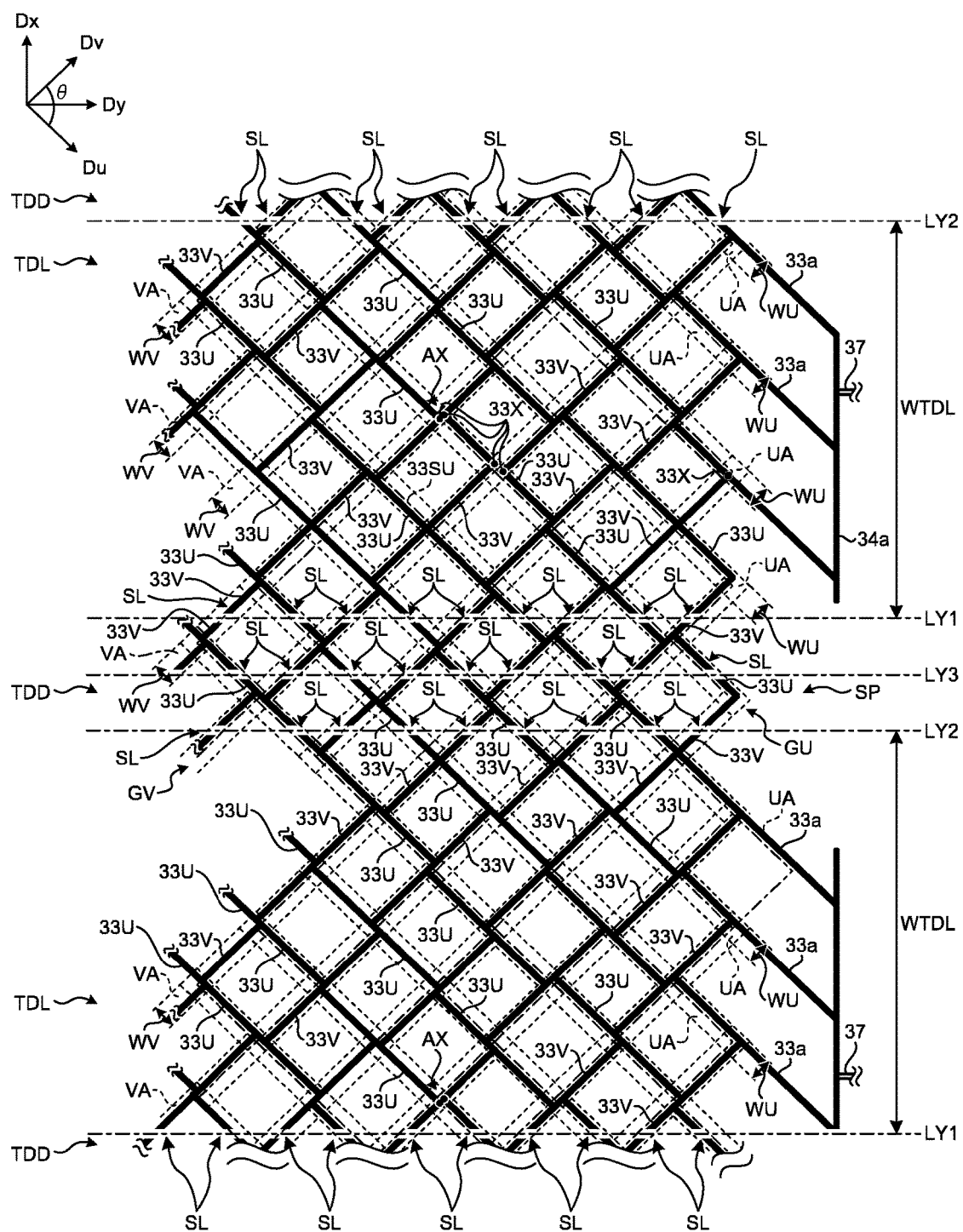
FIG. 15 is a plan view of the detection electrodes according to a second modification of the second embodiment.

FIG. 15 is a plan view of the detection electrodes according to a second modification of the second embodiment. As illustrated in FIG. 15, in the second modification of the second embodiment, a plurality of slits SL are arranged on a straight line LY1, a straight line LY2, or a straight line LY3 parallel to the direction Dy. The straight line LY1 is an imaginary straight line located at one end in the direction Dx of one of the detection electrodes TDL. The straight line LY2 is an imaginary straight line located at the other end in the direction Dx of one of the detection electrodes TDL. The straight line LY3 is disposed between the straight lines LY1 and LY2. For example, a width WTDL from the straight line LY1 to the straight line LY2 is constant. As a result, the two detection electrodes TDL adjacent to each other across the dummy electrode TDD have substantially the same parasitic capacitance. A plurality of such straight lines LY3 may be present between the straight lines LY1 and LY2. In other words, the region between the straight lines LY1 and LY2 may include a plurality of columns respectively constituted by a plurality of slits SL arranged on the same straight line.

Third Embodiment

Figure 16:
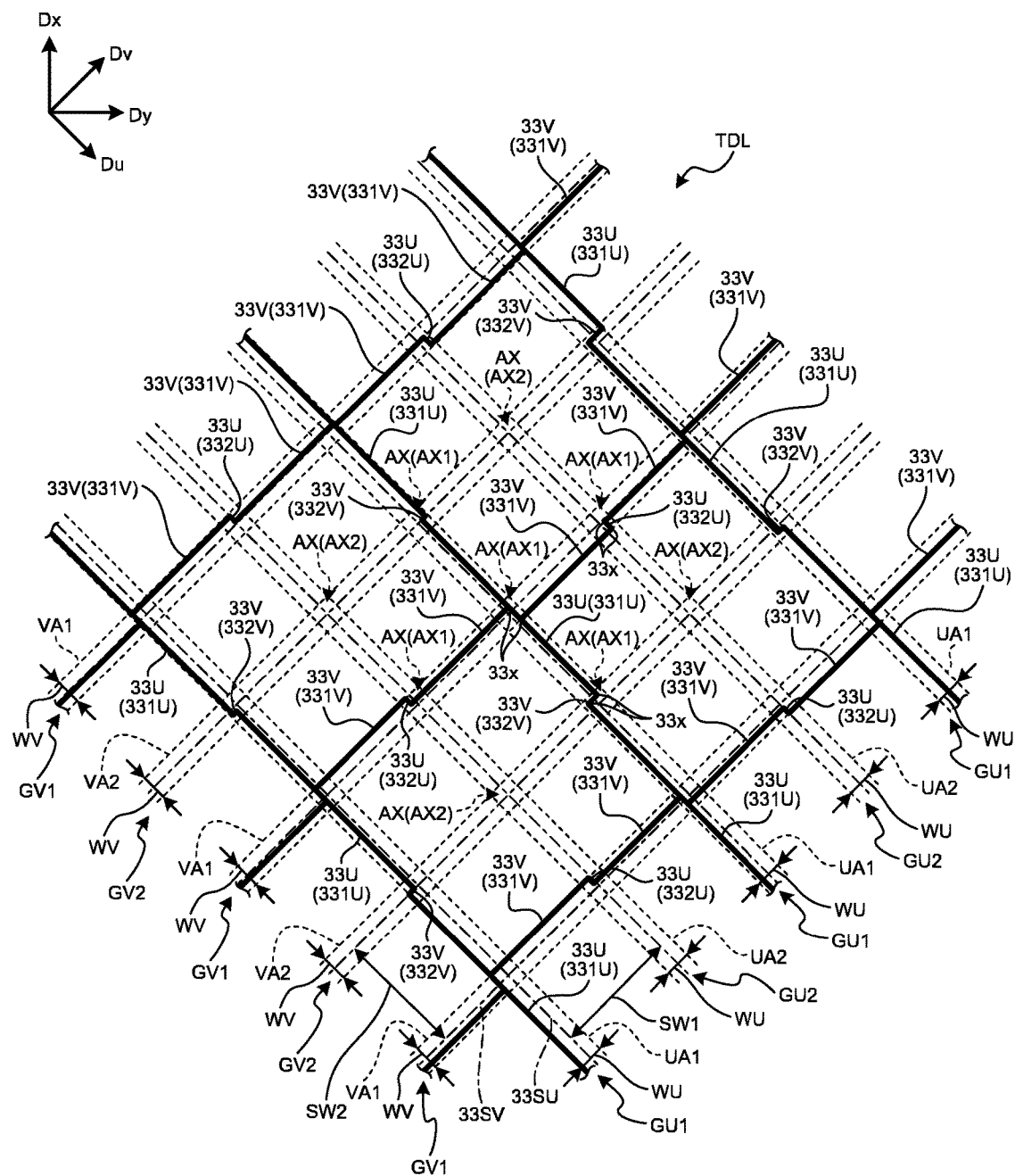
FIG. 16 is a plan view of the detection electrode according to a third embodiment.

The following describes a detection device according to a third embodiment. FIG. 16 is a plan view of the detection electrode according to the third embodiment. As illustrated in FIG. 16, in the third embodiment, the first conductive thin wires 33U include first main thin wires 331U and first auxiliary thin wires 332U, and the second conductive thin wires 33V include second main thin wires 331V and second auxiliary thin wires 332V. The same component as that described in the first embodiment above is denoted by the same reference numeral, and the description thereof will not be repeated.

As illustrated in FIG. 16, the first main thin wires 331U are arranged in first main strip-like regions UAa respectively having the predetermined width WU. A plurality of first main groups GU1 are formed, each including at least two of the first main thin wires 331U displaced from one another in the direction Dv. The first auxiliary thin wires 332U are arranged in first auxiliary strip-like regions UAb respectively having the predetermined width WU. A plurality of first auxiliary groups GU2 are formed, each including at least two of the first auxiliary thin wires 332U displaced from one another in the direction Dv. The first main strip-like regions UAa and the first auxiliary strip-like regions UAb are alternately arranged at even intervals in the direction Dv. The length between a first main strip-like region UAa and a first auxiliary strip-like region UAb adjacent to each other corresponds to the first reference length SW1.

As illustrated in FIG. 16, the second main thin wires 331V are arranged in second main strip-like regions VAa each having the predetermined width WV. A plurality of second main groups GV1 are formed, each including at least two of the second main thin wires 331V displaced from one another in the direction Du. The second auxiliary thin wires 332V are arranged in second auxiliary strip-like regions VAb each having the predetermined width WV. A plurality of second auxiliary groups GV2 are formed, each including at least two of the second auxiliary thin wires 332V displaced from one another in the direction Du. The second main strip-like regions VAa and the second auxiliary strip-like regions VAb are alternately arranged at even intervals in the direction Du. The length between a second main strip-like region VAa and a second auxiliary strip-like region VAb adjacent to each other corresponds to the second reference length SW2.

The length of each of the first main thin wires 331U is equal to or larger than the difference between twice the second reference length SW2 and the predetermined width WV, and is equal to or smaller than the sum of twice the second reference length SW2 and the predetermined width WV. Two of the electrical coupling parts 33x are formed in each of the first main thin wires 331U. One of the second auxiliary thin wires 332V is in contact with an end of the first main thin wire 331U, and another of the second auxiliary thin wires 332V is in contact with the other end of the first main thin wire 331U. In addition, two of the second main thin wires 331V are in contact with the middle of the first main thin wire 331U. In other words, two of the second main thin wires 331V and two of the second auxiliary thin wires 332V (four of the second conductive thin wires 33V) are in contact with each of the first main thin wires 331U.

The length of each of the first auxiliary thin wires 332U is equal to or smaller than the predetermined width WV. Two of the electrical coupling parts 33x are formed in each of the first auxiliary thin wires 332U. One of the second main thin wires 331V is in contact with an end of the first auxiliary thin wire 332U, and another of the second main thin wires 331V is in contact with the other end of the first auxiliary thin wire 332U. In other words, two of the second main thin wires 331V (two of the second conductive thin wires 33V) are in contact with each of the first auxiliary thin wires 332U.

The length of each of the second main thin wires 331V is equal to or larger than the difference between the first reference length SW1 and the predetermined width WU, and is equal to or smaller than the sum of the first reference length SW1 and the predetermined width Wu. Two of the electrical coupling parts 33x are produced in each of the second main thin wires 331V. One of the first main thin wires 331U is in contact with an end of the second main thin wire 331V, and one of the first auxiliary thin wires 332U is in contact with the other end of the second main thin wire 331V. In other words, one of the first main thin wires 331U and one of the first auxiliary thin wires 332U (two of the first conductive thin wires 33U) are in contact with each of the second main thin wires 331V.

The length of each of the second auxiliary thin wires 332V is equal to or smaller than the predetermined width WU. Two of the electrical coupling parts 33x are formed in each of the second auxiliary thin wires 332V. One of the first main thin wires 331U is in contact with an end of the second auxiliary thin wire 332V, and another of the first main thin wires 331U is in contact with the other end of the second auxiliary thin wire 332V. In other words, two of the first main thin wires 331U (two of the first conductive thin wires 33U) are in contact with each of the second auxiliary thin wires 332V.

As illustrated in FIG. 16, two of the electrical coupling parts 33x are formed in each of some of the intersection regions AX (intersection regions AX1). No electrical coupling parts 33x are formed in the other of the intersection regions AX (intersection regions AX2).

In the third embodiment, the area of each of the polygons formed by the first and second conductive thin wires 33U and 33V is less likely to vary than in the first embodiment. As a result, the display region 10a can more easily have a uniform aperture ratio.

Fourth Embodiment

Figure 17:
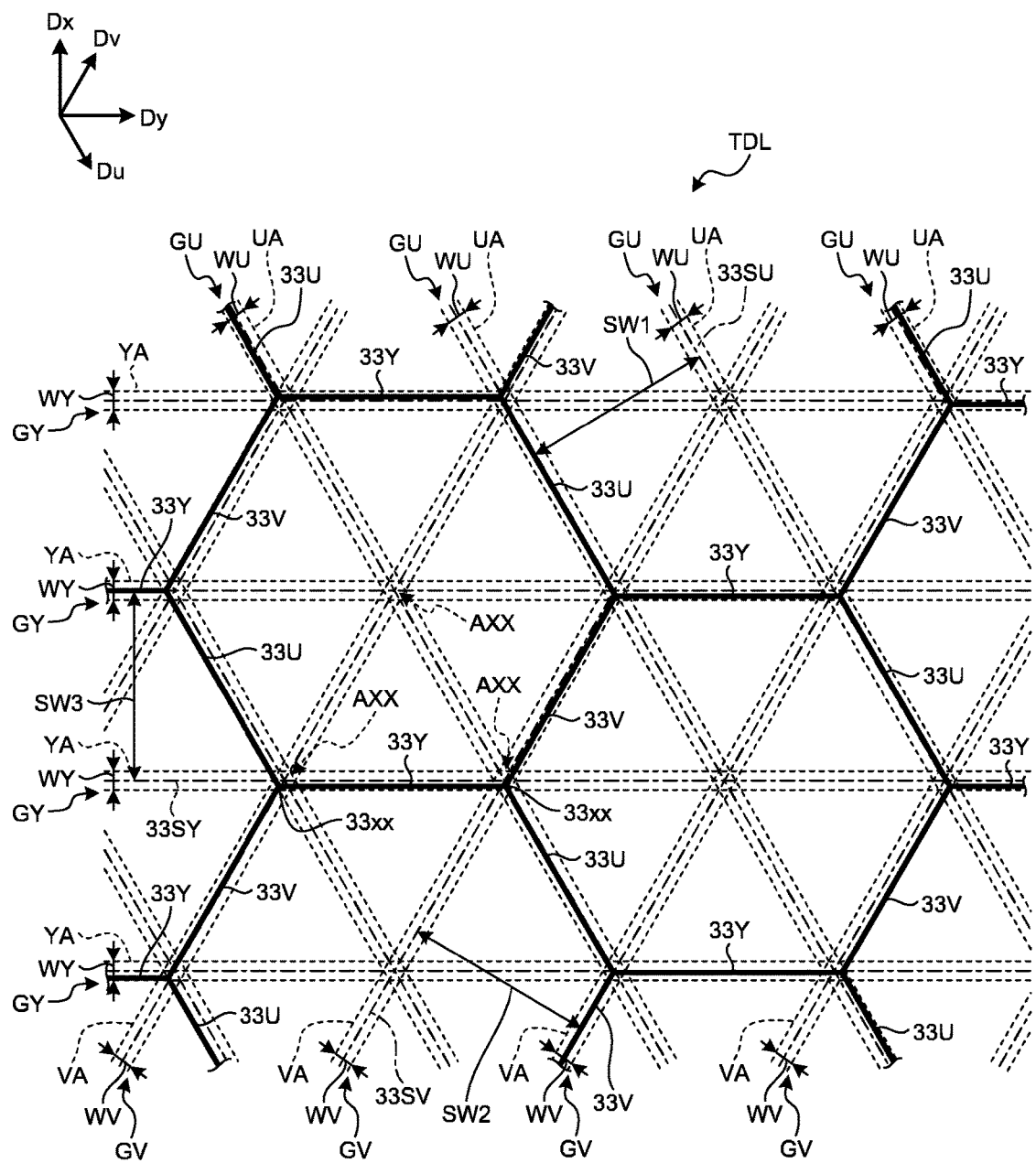
FIG. 17 is a plan view of the detection electrode according to a fourth embodiment.

The following describes a detection device according to a fourth embodiment. FIG. 17 is a plan view of the detection electrode according to the fourth embodiment. As illustrated in FIG. 17, in the fourth embodiment, the detection electrode TDL includes the first conductive thin wires 33U, the second conductive thin wires 33V, and third conductive thin wires 33Y. The same component as that described in the first embodiment above is denoted by the same reference numeral, and the description thereof will not be repeated.

As illustrated in FIG. 17, the first conductive thin wires 33U are arranged in the first strip-like regions UA respectively having the predetermined width WU. The first groups GU are formed, each including at least two of the first conductive thin wires 33U displaced from one another in the direction Dv.

The second conductive thin wires 33V are arranged in the second strip-like regions VA respectively having the predetermined width WV. The second groups GV are formed, each including at least two of the second conductive thin wires 33V displaced from one another in the direction Du.

The third conductive thin wires 33Y are arranged in third strip-like regions YA respectively having a predetermined width WY. A plurality of third groups GY are formed, each including at least two of the third conductive thin wires 33Y displaced from one another in the direction Dx. In the fourth embodiment, the predetermined width WY is also denoted as the third width.

A plurality of reference lines 33SY are imaginary lines that are arranged at even intervals in the direction Dx and extend in the direction Dy. Assuming each of the reference lines 33SY as the center of the predetermined width WY, the predetermined width WY is a width within which each of the third conductive thin wires 33Y may be displaced from the reference line 33SY. When a third reference length SW3 denotes the length between two of the reference lines 33SY adjacent in the direction Dx, the predetermined width WY is one twentieth to one fifth of the third reference length SW3. For example, the predetermined width WY is 10 μm to 30 μm.

One mesh of the detection electrode TDL has a hexagonal shape. In other words, two of the first conductive thin wires 33U, two of the second conductive thin wires 33V, and two of the third conductive thin wires 33Y form a hexagon.

One of the first conductive thin wires 33U, one of the second conductive thin wires 33V, and one of the third conductive thin wires 33Y are in contact with one another in an intersection region AXX where one of the first strip-like regions UA, one of the second strip-like regions VA, and one of the third strip-like regions YA intersect one another. In other words, the third conductive thin wire 33Y is in contact with an electrical coupling part 33$xx$ that is an intersection between the first conductive thin wire 33U and the second conductive thin wire 33V. The intersection region AXX is a hexagonal region. One such electrical coupling part 33$xx$ is formed in some of the intersection regions AXX. The electrical coupling part 33$xx$ is not formed in the other of the intersection regions AXX.

In this manner, the detection electrodes TDL may include the third conductive thin wires 33Y extending in a different direction from those of the first and second conductive thin wires 33U and 33V, in addition to the first and second conductive thin wires 33U and 33V.

Fifth Embodiment

Figure 18:
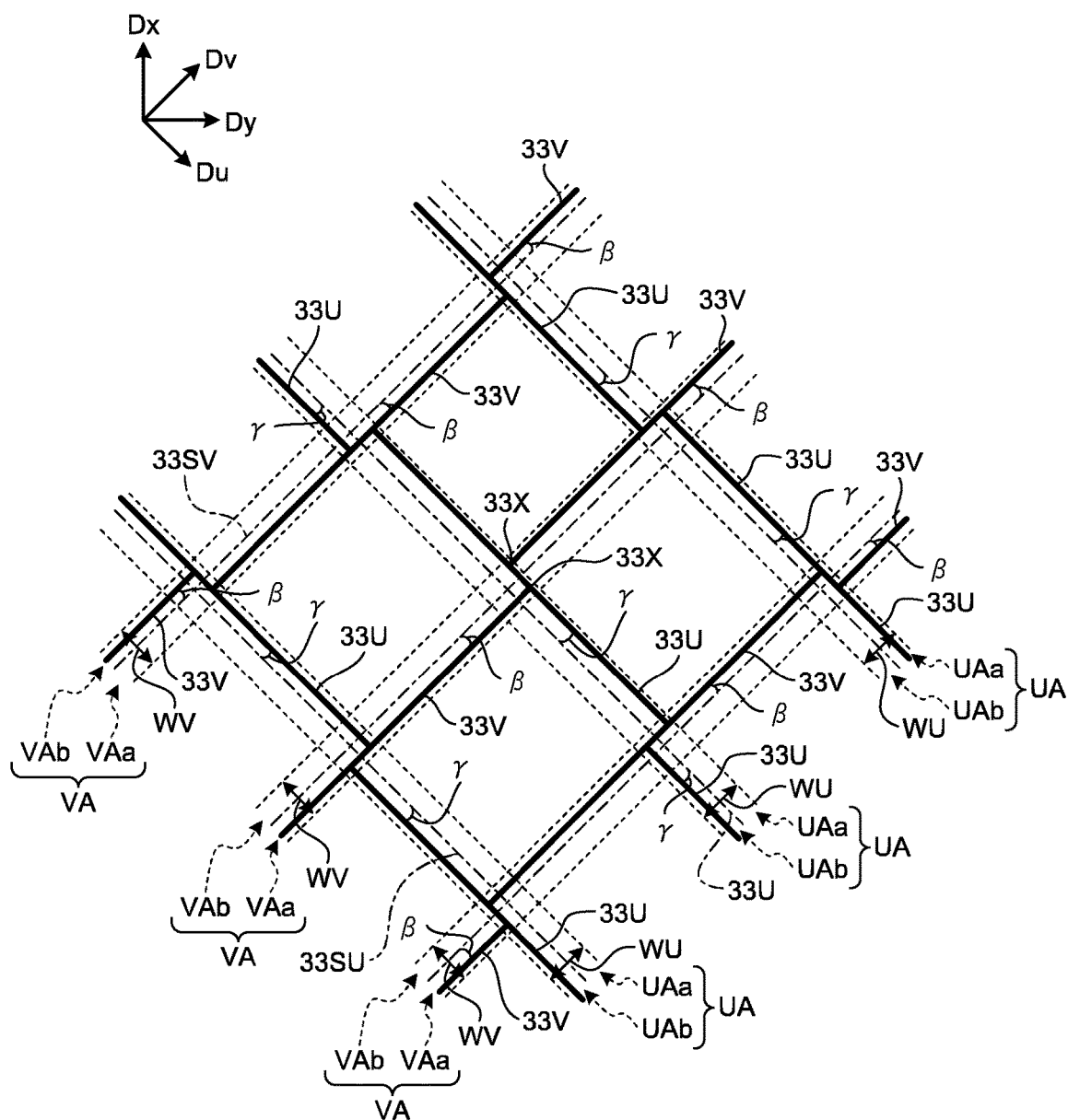
FIG. 18 is a plan view of the detection electrode according to a fifth embodiment.

FIG. 18 is a plan view of the detection electrode according to a fifth embodiment. The same component as that described in the first embodiment above is denoted by the same reference numeral, and the description thereof will not be repeated.

As illustrated in FIG. 18, each of the first strip-like regions UA includes a first right region UAa and a first left region UAb separated by the first reference line 33SU. In the fifth embodiment, each of the first conductive thin wires 33U is disposed in either of the first right region UAa and the first left region UAb. The lengthy serving as a displacement distance of the first conductive thin wire 33U from the first reference line 33SU is a value randomly selected from values within a predetermined range excluding zero. In other words, the frequency of appearance of values selected as the length γ is uniform. For example, the length γ is selected from values in the range of 5 μm to 15 μm.

In each of the first strip-like regions UA, the first conductive thin wires 33U disposed in the first right region UAa and the first conductive thin wires 33U disposed in the first left region UAb are alternately arranged along the direction Du. In other words, in each of the first strip-like regions UA, the first conductive thin wires 33U adjacent to the first conductive thin wires 33U disposed in the first right region UAa are disposed in the first left region UAb, and the first conductive thin wires 33U adjacent to the first conductive thin wires 33U disposed in the first left region UAb are disposed in the first right region UAa. For example, a random number determines the direction of displacement of the first conductive thin wire 33U from the first reference line 33SU. A computer generates the random number. At the time of designing the first conductive thin wires 33U included in each of the first strip-like regions UA, the computer controls the random number so that positive values and negative values alternately appear along the direction Du.

As illustrated in FIG. 18, each of the second strip-like regions VA includes a second right region VAa and a second left region VAb separated by the second reference line 33SV. In the fifth embodiment, each of the second conductive thin wires 33V is disposed in either of the second right region VAa and the second left region VAb. The length β serving as a displacement distance of the second conductive thin wire 33V from the second reference line 33SV is a value randomly selected from values within the predetermined range excluding zero. In other words, the frequency of appearance of values selected as the length β is uniform. For example, the length β is selected from values in the range of 5 μm to 15 μm.

In each of the second strip-like regions VA, the second conductive thin wires 33V disposed in the second right region VAa and the second conductive thin wires 33V disposed in the second left region VAb are alternately arranged along the direction Dv. In other words, in each of the second strip-like regions VA, the second conductive thin wires 33V adjacent to the second conductive thin wires 33V disposed in the second right region VAa are disposed in the second left region VAb, and the second conductive thin wires 33V adjacent to the second conductive thin wires 33V disposed in the second left region VAb are disposed in the second right region VAa. For example, a random number determines the direction of displacement of the second conductive thin wire 33V from the second reference line 33SV. The computer generates the random number. At the time of designing the second conductive thin wires 33V included in each of the second strip-like regions VA, the computer controls the random number so that positive values and negative values alternately appear along the direction Dv.

The above-described configuration prevents the first and second conductive thin wires 33U and 33V from crisscrossing each other, as illustrated in FIG. 18. As a result, the difference decreases between the aperture ratio of surrounding areas of the electrical coupling parts 33$x$ and that of the other areas, and hence, visibility is improved.

Sixth Embodiment

Figure 19:
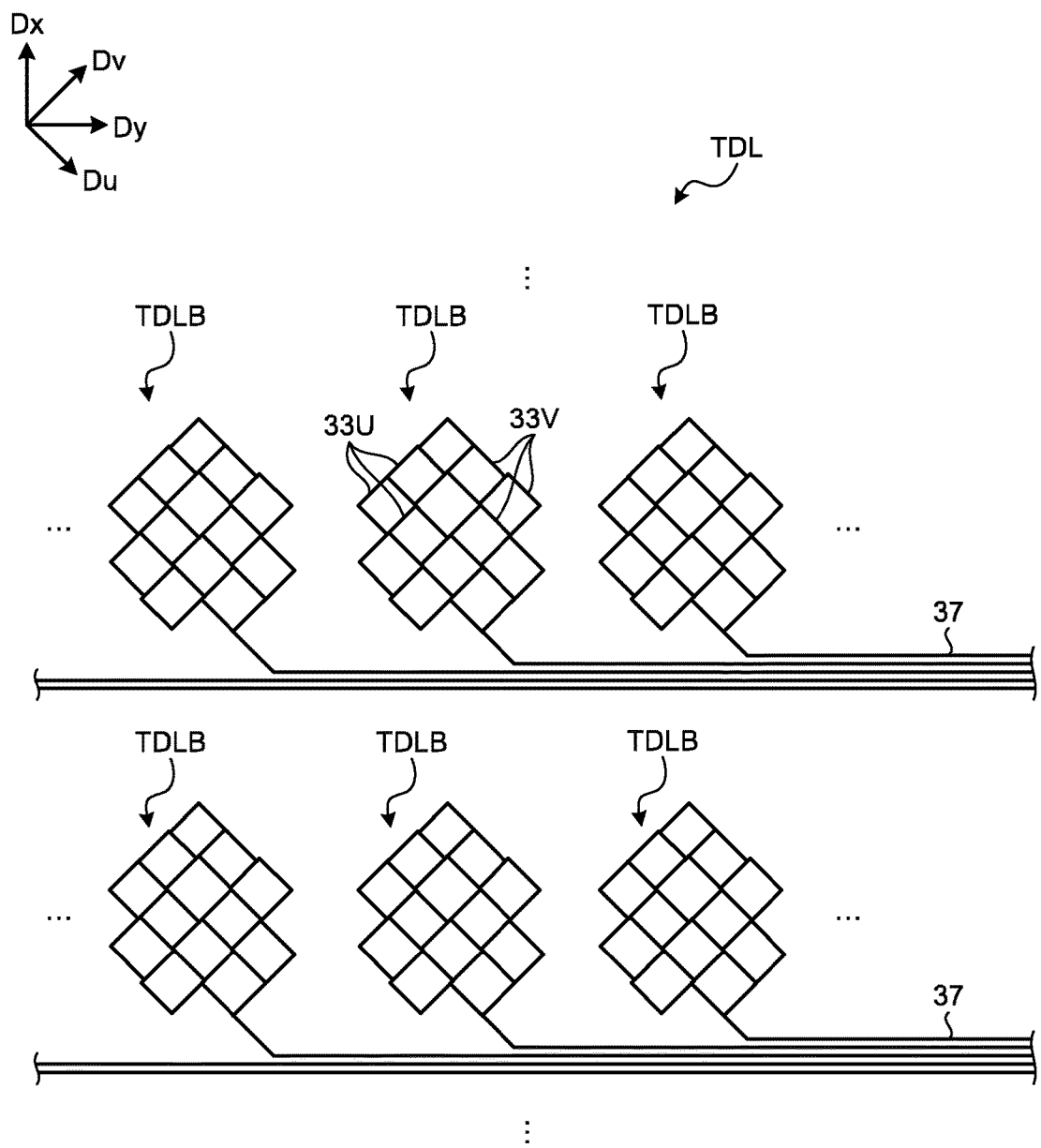
FIG. 19 is a plan view of the detection electrodes according to a sixth embodiment.

FIG. 19 is a plan view of the detection electrodes according to a sixth embodiment. As illustrated in FIG. 19, the detection electrode TDL according to the sixth embodiment includes a plurality of detection blocks TDLB respectively including the first conductive thin wires 33U and the second conductive thin wires 33V. For example, the detection blocks TDLB are arranged in a matrix in a plane parallel to the substrate 31. Each of the detection blocks TDLB is coupled to the flexible printed circuit board 71 (refer to FIG. 8) through the wiring line 37. The detection device 30 according to the sixth embodiment performs the touch detection operation using the self-capacitive method, instead of using the mutual-capacitive method.

Figure 20:
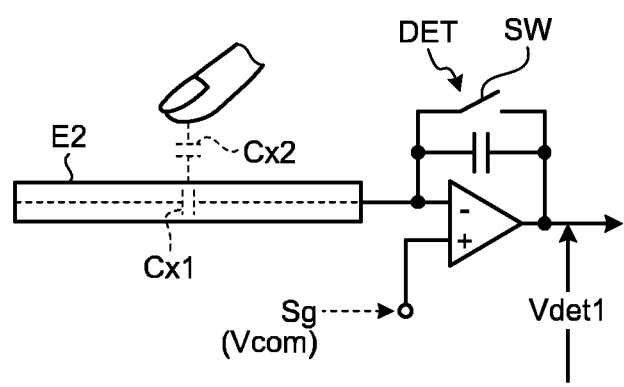
FIG. 20 is an explanatory diagram illustrating an exemplary equivalent circuit for self-capacitive touch detection.

The following describes the basic principle of the self-capacitive touch detection with reference to FIG. 20. FIG. 20 is an explanatory diagram illustrating an exemplary equivalent circuit for the self-capacitive touch detection.

As illustrated in FIG. 20, the voltage detector DET is coupled to the detection electrode E2. The voltage detector DET is a circuit that includes an operational amplifier in an imaginary short-circuited state. When the AC rectangular wave Sg having the predetermined frequency (such as substantially several kilohertz to several hundred kilohertz)

is applied to a non-inverting input unit (positive), the AC rectangular wave Sg having the same potential is applied to the detection electrode E2.

In the state where the conductor, such as the finger, is neither in contact with nor in proximity to the detection electrode (non-contact state), a current corresponding to a capacitance Cx1 in the detection electrode E2 flows. The voltage detector DET converts a variation in the current corresponding to the AC rectangular wave Sg into a variation (waveform) of voltage. In the state where the conductor, such as the finger, is in contact with or in proximity to the detection electrode (contact state), a capacitance Cx2 generated by the finger proximate to the detection electrode E2 is added to the capacitance Cx1 in the detection electrode E2, and a current corresponding to a capacitance (Cx1+Cx2) increased from the capacitance in the non-contact state flows. The voltage detector DET converts the variation in the current corresponding to the AC rectangular wave Sg into a variation (waveform) of voltage. The amplitude of the waveform in the contact state is larger than that in the non-contact state. As a result, the absolute value of a voltage difference between the waveform in the contact state and the waveform in the non-contact state changes according to the influence of the conductor, such as the finger, coming into contact or approaching the detection electrode from the outside. A switch SW is placed in the ON (open) state when the touch detection is performed, and is placed in the OFF (closed) state to perform a reset operation of the voltage detector DET when the touch detection is not performed.

Other operational advantages accruing from the aspects described in the embodiments given above that are obvious from the description in this specification, or that are appropriately conceivable by those skilled in the art will naturally be understood as accruing from the present invention.

The present invention can be widely applied to a detection device and a display device according to the following aspects.

(1) A detection device comprising:
a substrate;
a plurality of first conductive thin wires that are provided in a plane parallel to the substrate and extend in a first direction;
a plurality of second conductive thin wires that are provided in the same layer as that of the first conductive thin wires and extend in a second direction forming an angle with the first direction;
first groups that are disposed in first strip-like regions respectively having a first width, each of the first groups including at least two of the first conductive thin wires displaced from one another in the second direction; and
second groups that are disposed in second strip-like regions respectively having a second width, each of the second groups including at least two of the second conductive thin wires displaced from one another in the first direction, wherein
the first conductive thin wires are in contact with the second conductive thin wires in intersection regions between the first strip-like regions and the second strip-like regions.

(2) The detection device according to (1), wherein each of the intersection regions between the first strip-like regions and the second strip-like regions includes two coupling parts where the first conductive thin wires are in contact with the second conductive thin wires.

(3) The detection device according to (1) or (2) further comprising a plurality of coupling parts where the first conductive thin wires are in contact with the second conductive thin wires, and one of the first conductive thin wires or one of the second conductive thin wires located between two of the coupling parts has a slit.

(4) The detection device according to any one of (1) to (3), wherein one mesh surrounded by the first conductive thin wires and the second conductive thin wires has a parallelogram shape.

(5) The detection device according to any one of (1) to (4), wherein
when a first reference line denotes a straight line that bisects each of the first strip-like regions in a width direction thereof, and a second reference line denotes a straight line that bisects each of the second strip-like regions in a width direction thereof,
a length of each of the first conductive thin wires is equal to or larger than a difference between twice a length between the adjacent second reference lines and the second width of the second strip-like region, and is equal to or smaller than a sum of twice the length between the adjacent second reference lines and the second width of the second strip-like region, and
a length of each of the second conductive thin wires is equal to or larger than a difference between twice a length between the adjacent first reference lines and the first width of the first strip-like region, and is equal to or smaller than a sum of twice the length between the adjacent first reference lines and the first width of the first strip-like region.

(6) The detection device according to (1), wherein
the first conductive thin wires include first main thin wires disposed in a first main strip-like region having the first width and first auxiliary thin wires disposed in a first auxiliary strip-like region having the first width,
the second conductive thin wires include second main thin wires disposed in a second main strip-like region having the second width and second auxiliary thin wires disposed in a second auxiliary strip-like region having the second width,
each of the first main thin wires is in contact with two of the second main thin wires and two of the second auxiliary thin wires,
each of the first auxiliary thin wires is in contact with two of the second main thin wires,
each of the second main thin wires is in contact with one of the first main thin wires and one of the first auxiliary thin wires, and
each of the second auxiliary thin wires is in contact with two of the first main thin wires.

(7) The detection device according to (1), further comprising:
a plurality of third conductive thin wires that are provided in the same layer as that of the first conductive thin wires and extend in a third direction forming angles with the first direction and the second direction; and
third groups that are disposed in third strip-like regions respectively having a third width, each of the third groups including at least two of the third conductive thin wires displaced from one another in a direction orthogonal to the third direction, wherein
the first conductive thin wires, the second conductive thin wires, and the third conductive thin wires are in contact with one another in intersection regions among the first strip-like regions, the second strip-like regions, and the third strip-like regions.

(8) The detection device according to (1), wherein
each of the first strip-like regions includes a first right region and a first left region separated by a first reference line, wherein the first reference line bisects the first strip-like region in the second direction, in each of the first strip-like regions, the first conductive thin wires disposed in the first right region and the first conductive thin wires disposed in the first left region are alternately arranged along the first direction, each of the second strip-like regions includes a second right region and a second left region separated by a second reference line, wherein the second reference line bisects the second strip-like region in the first direction, and in each of the second strip-like regions, the second conductive thin wires disposed in the second right region and the second conductive thin wires disposed in the second left region are alternately arranged along the second direction.

(9) A display device comprising;
a detection device; and
a display region, wherein
the detection device comprises:
a substrate;
a plurality of first conductive thin wires that are provided in a plane parallel to the substrate and extend in a first direction;
a plurality of second conductive thin wires that are provided in the same layer as that of the first conductive thin wires and extend in a second direction forming an angle with the first direction;
first groups that are disposed in first strip-like regions respectively having a first width, each of the first groups including at least two of the first conductive thin wires displaced from one another in the second direction; and
second groups that are disposed in second strip-like regions respectively having a second width, each of the second groups including at least two of the second conductive thin wires displaced from one another in the first direction, wherein
the first conductive thin wires are in contact with the second conductive thin wires in intersection regions between the first strip-like regions and the second strip-like regions, and the first conductive thin wires and the second conductive thin wire are provided in an area overlapping the display region.

(10) The display device according to (9), wherein each of the intersection regions between the first strip-like regions and the second strip-like regions includes two coupling parts where the first conductive thin wires are in contact with the second conductive thin wires.

(11) The display device according to (9) or (10), further comprising a plurality of coupling parts where the first conductive thin wires are in contact with the second conductive thin wires, and one of the first conductive thin wires or one of the second conductive thin wires located between two of the coupling parts has a slit.

(12) The display device according to any one of (9) to (11), wherein one mesh surrounded by the first conductive thin wires and the second conductive thin wires has a parallelogram shape.

(13) The display device according to any one of (9) to (12), wherein
when a first reference line denotes a straight line that bisects each of the first strip-like regions in a width direction thereof, and a second reference line denotes a straight line that bisects each of the second strip-like regions in a width direction thereof,
a length of each of the first conductive thin wires is equal to or larger than a difference between twice a length between the adjacent second reference lines and the second width of the second strip-like region, and is equal to or smaller than a sum of twice the length between the adjacent second reference lines and the second width of the second strip-like region, and a length of each of the second conductive thin wires is equal to or larger than a difference between twice a length between the adjacent first reference lines and the first width of the first strip-like region, and is equal to or smaller than a sum of twice the length between the adjacent first reference lines and the first width of the first strip-like region.

(14) The display device according to (9), wherein
the first conductive thin wires include first main thin wires disposed in a first main strip-like region having the first width and first auxiliary thin wires disposed in a first auxiliary strip-like region having the first width,
the second conductive thin wires include second main thin wires disposed in a second main strip-like region having the second width and second auxiliary thin wires disposed in a second auxiliary strip-like region having the second width,
each of the first main thin wires is in contact with two of the second main thin wires and two of the second auxiliary thin wires,
each of the first auxiliary thin wires is in contact with two of the second main thin wires,
each of the second main thin wires is in contact with one of the first main thin wires and one of the first auxiliary thin wires, and
each of the second auxiliary thin wires is in contact with two of the first main thin wires.

(15) The display device according to (9), further comprising:
a plurality of third conductive thin wires that are provided in the same layer as that of the first conductive thin wires and extend in a third direction forming angles with the first direction and the second direction; and
third groups that are disposed in third strip-like regions respectively having a third width, each of the third groups including at least two of the third conductive thin wires displaced from one another in a direction orthogonal to the third direction, wherein
the first conductive thin wires, the second conductive thin wires, and the third conductive thin wires are in contact with one another in intersection regions among the first strip-like regions, the second strip-like regions, and the third strip-like regions.

(16) The display device according to (9), wherein
each of the first strip-like regions includes a first right region and a first left region separated by a first reference line, wherein the first reference line bisects the first strip-like region in the second direction,
in each of the first strip-like regions, the first conductive thin wires disposed in the first right region and the first conductive thin wires disposed in the first left region are alternately arranged along the first direction,
each of the second strip-like regions includes a second right region and a second left region separated by a second reference line, wherein the second reference line bisects the second strip-like region in the first direction, and
in each of the second strip-like regions, the second conductive thin wires disposed in the second right region and the second conductive thin wires disposed in the second left region are alternately arranged along the second direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A detection device comprising:
   a substrate;
   a plurality of first conductive thin wires that are provided in a plane parallel to the substrate and extend in a first direction;
   a plurality of second conductive thin wires that are provided in the same layer as that of the first conductive thin wires and extend in a second direction forming an angle with the first direction;
   a first region surrounded by two of the first conductive thin wires and two of the second conductive thin wires;
   a second region surrounded by two of the first conductive thin wires and two of the second conductive thin wires;
   a third region surrounded by two of the first conductive thin wires and two of the second conductive thin wires;
   a fourth region surrounded by two of the first conductive thin wires and two of the second conductive thin wires; and
   a fifth region surrounded by two of the first conductive thin wires and two of the second conductive thin wires, wherein
   one of the second conductive thin wires surrounding the second region corresponds to one of the second conductive thin wires surrounding the first region,
   one of the second conductive thin wires surrounding the fourth region corresponds to another one of the second conductive thin wires surrounding the first region,
   one of the first conductive thin wires surrounding the third region corresponds to one of the first conductive thin wires surrounding the first region,
   one of the first conductive thin wires surrounding the fifth region corresponds to another one of the first conductive thin wires surrounding the first region,
   a length of the first region in the first direction is a first length,
   a length of the first region in the second direction is a fourth length,
   a length of the second region in the first direction is a second length that is different from the first length,
   a length of the fourth region in the first direction is a third length that is different from the first length,
   a length of the third region in the second direction is a fifth length that is different from the fourth length, and
   a length of the fifth region in the second direction is a sixth length that is different from the fourth length.

2. The detection device according to claim 1, wherein
   the plurality of first conductive thin wires are disposed in a first strip-like region having a first width, at least two of the first conductive thin wires being displaced from one another in the second direction,
   the plurality of second conductive thin wires are disposed in a second strip-like region having a second width, at least two of the second conductive thin wires being displaced from one another in the first direction,
   a length of the second region in the second direction is a seventh length that is different from the fourth length,
   a length of the third region in the first direction is an eighth length that is different from the first length,
   a first reference line denotes a straight line that bisects each of the first strip-like regions in a width direction thereof, a second reference line denotes a straight line that bisects each of the second strip-like regions in a width direction thereof,
   a first reference length denotes a length between the first reference lines that are adjacent to one another, a second reference length denotes a length between the second reference lines that are adjacent to one another,
   a difference between the fourth length and the seventh length is one twentieth to one fifth of the first reference length inclusive, and
   a difference between the first length and the eighth length is one twentieth to one fifth of the second reference length inclusive.

3. A display device comprising:
   a detection device; and
   a display region, wherein
   the detection device comprises:
   a substrate;
   a plurality of first conductive thin wires that are provided in a plane parallel to the substrate and extend in a first direction;
   a plurality of second conductive thin wires that are provided in the same layer as that of the first conductive thin wires and extend in a second direction forming an angle with the first direction;
   a first region surrounded by two of the first conductive thin wires and two of the second conductive thin wires;
   a second region surrounded by two of the first conductive thin wires and two of the second conductive thin wires;
   a third region surrounded by two of the first conductive thin wires and two of the second conductive thin wires;
   a fourth region surrounded by two of the first conductive thin wires and two of the second conductive thin wires; and
   a fifth region surrounded by two of the first conductive thin wires and two of the second conductive thin wires, wherein
   one of the second conductive thin wires surrounding the second region corresponds to one of the second conductive thin wires surrounding the first region,
   one of the second conductive thin wires surrounding the fourth region corresponds to another one of the second conductive thin wires surrounding the first region,
   one of the first conductive thin wires surrounding the third region corresponds to one of the first conductive thin wires surrounding the first region,
   one of the first conductive thin wires surrounding the fifth region corresponds to another one of the first conductive thin wires surrounding the first region,
   a length of the first region in the first direction is a first length,
   a length of the first region in the second direction is a fourth length,
   a length of the second region in the first direction is a second length that is different from the first length,
   a length of the fourth region in the first direction is a third length that is different from the first length,
   a length of the third region in the second direction is a fifth length that is different from the fourth length, and
   a length of the fifth region in the second direction is a sixth length that is different from the fourth length.

4. The display device according to claim 3, wherein
   the plurality of first conductive thin wires are disposed in a first strip-like region having a first width, at least two of the first conductive thin wires being displaced from one another in the second direction, the plurality of second conductive thin wires are disposed in a second strip-like region having a second width, at least two of the second conductive thin wires being displaced from one another in the first direction, a length of the second region in the second direction is a seventh length that is different from the fourth length, a length of the third region in the first direction is an eighth length that is different from the first length, a first reference line denotes a straight line that bisects each of the first strip-like regions in a width direction thereof, a second reference line denotes a straight line that bisects each of the second strip-like regions in a width direction thereof, a first reference length denotes a length between the first reference lines that are adjacent to one another, a second reference length denotes a length between the second reference lines that are adjacent to one another, a difference between the fourth length and the seventh length is one twentieth to one fifth of the first reference length inclusive, and a difference between the first length and the eighth length is one twentieth to one fifth of the second reference length inclusive.

5. A detection device comprising:

a substrate;

a plurality of first conductive thin wires that are provided in a plane parallel to the substrate and extend in a first direction, the plurality of first conductive thin wires being disposed in a first strip-like region having a first width, at least two of the first conductive thin wires being displaced from one another in the second direction;

a plurality of second conductive thin wires that are provided in the same layer as that of the first conductive thin wires and extend in a second direction forming an angle with the first direction, the plurality of second conductive thin wires being disposed in a second strip-like region having a second width, at least two of the second conductive thin wires being displaced from one another in the first direction;

a first region surrounded by two of the first conductive thin wires and two of the second conductive thin wires;

a second region surrounded by two of the first conductive thin wires and two of the second conductive thin wires; and a third region surrounded by two of the first conductive thin wires and two of the second conductive thin wires, wherein one of the second conductive thin wires surrounding the second region corresponds to one of the second conductive thin wires surrounding the first region, one of the first conductive thin wires surrounding the third region corresponds to one of the first conductive thin wires surrounding the first region, a first reference line denotes a straight line that bisects each of the first strip-like regions in a width direction thereof, a second reference line denotes a straight line that bisects each of the second strip-like regions in a width direction thereof, a first reference length denotes a length between the first reference lines that are adjacent to one another, a second reference length denotes a length between the second reference lines that are adjacent to one another, a difference between a length of the first region in the second direction and a length of the second region in the second direction is one twentieth to one fifth of the first reference length inclusive, and a difference between a length of the first region in the first direction and a length of the third region in the first direction is one twentieth to one fifth of the second reference length inclusive.

6. The detection device according to claim 5, comprising:

a fourth region surrounded by two of the first conductive thin wires and two of the second conductive thin wires; and a fifth region surrounded by two of the first conductive thin wires and two of the second conductive thin wires, wherein one of the second conductive thin wires surrounding the fourth region corresponds to another one of the second conductive thin wires surrounding the first region, one of the first conductive thin wires surrounding the fifth region corresponds to another one of the first conductive thin wires surrounding the first region, a difference between a length of the first region in the second direction and a length of the fifth region in the second direction is one twentieth to one fifth of the first reference length inclusive, and a difference between a length of the first region in the first direction and a length of the fourth region in the first direction is one twentieth to one fifth of the second reference length inclusive.

7. A display device comprising:

a detection device; and a display region, wherein the detection device comprises:

a substrate;

a plurality of first conductive thin wires that are provided in a plane parallel to the substrate and extend in a first direction, the plurality of first conductive thin wires being disposed in a first strip-like region having a first width, at least two of the first conductive thin wires being displaced from one another in the second direction;

a plurality of second conductive thin wires that are provided in the same layer as that of the first conductive thin wires and extend in a second direction forming an angle with the first direction, the plurality of second conductive thin wires being disposed in a second strip-like region having a second width, at least two of the second conductive thin wires being displaced from one another in the first direction;

a first region surrounded by two of the first conductive thin wires and two of the second conductive thin wires;

a second region surrounded by two of the first conductive thin wires and two of the second conductive thin wires; and a third region surrounded by two of the first conductive thin wires and two of the second conductive thin wires, wherein one of the second conductive thin wires surrounding the second region corresponds to one of the second conductive thin wires surrounding the first region, one of the first conductive thin wires surrounding the third region corresponds to one of the first conductive thin wires surrounding the first region, a first reference line denotes a straight line that bisects each of the first strip-like regions in a width direction thereof, a second reference line denotes a straight line that bisects each of the second strip-like regions in a width direction thereof, a first reference length denotes a length between the first reference lines that are adjacent to one another, and a second reference length denotes a length between the second reference lines that are adjacent to one another, a difference between a length of the first region in the second direction and a length of the second region in the second direction is one twentieth to one fifth of the first reference length inclusive, and a difference between a length of the first region in the first direction and a length of the third region in the first direction is one twentieth to one fifth of the second reference length inclusive.

8. The display device according to claim 7, comprising:

a fourth region surrounded by two of the first conductive thin wires and two of the second conductive thin wires; and a fifth region surrounded by two of the first conductive thin wires and two of the second conductive thin wires, wherein one of the second conductive thin wires surrounding the fourth region corresponds to another one of the second conductive thin wires surrounding the first region, one of the first conductive thin wires surrounding the fifth region corresponds to another one of the first conductive thin wires surrounding the first region, a difference between a length of the first region in the second direction and a length of the fifth region in the second direction is one twentieth to one fifth of the first reference length inclusive, and a difference between a length of the first region in the first direction and a length of the fourth region in the first direction is one twentieth to one fifth of the second reference length inclusive.

\* \* \* \* \*